US012749735B2

(12) United States Patent
Chen et al.

(10) Patent No.: US 12,749,735 B2

(45) Date of Patent: Sep. 29, 2026

(54) ENERGY STORAGE BOX AND ENERGY STORAGE SYSTEM

(71) Applicant: CONTEMPORARY AMPEREX TECHNOLOGY CO., LIMITED, Ningde (CN)

(72) Inventors: Ming Chen, Ningde (CN); Xiyang Zuo, Ningde (CN); Kaibo Yin, Ningde (CN); Guangsheng Luo, Ningde (CN); Zhonghong Li, Ningde (CN); Jinmei Xu, Ningde (CN); Kai Wu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/326,976

(22) Filed: Sep. 12, 2025

(65) Prior Publication Data

US 2026/0011815 A1 Jan. 8, 2026

Related U.S. Application Data

(63) Continuation of application No. PCT/CN2024/097820, filed on Jun. 6, 2024.

(30) Foreign Application Priority Data

Jul. 31, 2023 (CN) ......................... 202310952652.4

(51) Int. Cl.

*H01M 10/6556* (2014.01)
*H01M 10/42* (2006.01)

(Continued)

(52) U.S. Cl.

CPC ..... *H01M 10/6556* (2015.04); *H01M 10/425* (2013.01); *H01M 10/613* (2015.04);

(Continued)

(58) Field of Classification Search

CPC .... H01M 10/613; H01M 10/61; H01M 10/60; H01M 8/04029; H01M 8/04014;

(Continued)

(56) References Cited

U.S. PATENT DOCUMENTS

| | | | | |
|---|---|---|---|---|
| 8,574,734 B2 * | 11/2013 | Eisenhour ........... | H01M 10/625 429/61 |
| 2013/0273829 A1 * | 10/2013 | Obasih ................ | H01M 10/613 429/83 |

(Continued)

FOREIGN PATENT DOCUMENTS

| | | |
|---|---|---|
| CN | 217881677 U | 11/2022 |
| CN | 115692927 A | 2/2023 |

(Continued)

OTHER PUBLICATIONS

The World Intellectual Property Organization (WIPO) International Search Report for PCT/CN2024/097820 Sep. 18, 2024 4 Pages (including translation).

*Primary Examiner* — Adam B Dravininkas

(74) *Attorney, Agent, or Firm* — ANOVA LAW GROUP, PLLC

(57) ABSTRACT

An energy storage box includes: a box body, a power distribution box, an energy storage device having a first medium flow path; and a heat exchange mechanism including a heat exchange device and a temperature adjustment device. At least part of the heat exchange device is arranged in the power distribution box. The heat exchange device has a second medium flow path. The temperature adjustment device communicates with the first medium flow path to form a first medium circulation flow path. The temperature adjustment device is connected to the second medium flow path to form a second medium circulation flow path. The first medium circulation flow path and the second medium circulation flow path include a heat exchange medium (Continued)

therein, and the temperature adjustment device is configured to adjust the temperature of the heat exchange medium.

20 Claims, 7 Drawing Sheets

(51) Int. Cl.

| | |
|---|---|
| ***H01M 10/613*** | (2014.01) |
| ***H01M 10/615*** | (2014.01) |
| ***H01M 10/635*** | (2014.01) |
| ***H01M 10/6551*** | (2014.01) |
| ***H01M 10/6563*** | (2014.01) |
| ***H01M 10/6566*** | (2014.01) |
| ***H01M 10/6568*** | (2014.01) |

(52) U.S. Cl.
CPC ....... *H01M 10/615* (2015.04); *H01M 10/635* (2015.04); *H01M 10/6551* (2015.04); *H01M 10/6563* (2015.04); *H01M 10/6566* (2015.04); *H01M 10/6568* (2015.04)

(58) Field of Classification Search
CPC ........... H01M 8/04037; H01M 10/615; H01M 10/6556; H01M 10/425; H01M 10/635; H01M 10/6563; H01M 10/6567; H01M 10/6568
See application file for complete search history.

(56) References Cited

U.S. PATENT DOCUMENTS

| | | | | |
|---|---|---|---|---|
| 2015/0343970 | A1* | 12/2015 | Choi .................. | H01M 10/425 307/9.1 |
| 2017/0288286 | A1* | 10/2017 | Buckhout ........... | H01M 50/519 |
| 2020/0067156 | A1* | 2/2020 | Chi ..................... | H01M 10/625 |
| 2021/0136946 | A1* | 5/2021 | Welser ................ | H01M 10/425 |
| 2024/0014464 | A1* | 1/2024 | Jang .................. | H01M 10/6567 |
| 2024/0021912 | A1* | 1/2024 | Xiong ............... | H01M 10/6571 |

FOREIGN PATENT DOCUMENTS

| | | | |
|---|---|---|---|
| CN | 115800483 | A | 3/2023 |
| CN | 115939602 | A | 4/2023 |
| CN | 115621635 | B | 10/2024 |
| WO | 2023082616 | A1 | 5/2023 |

* cited by examiner

ENERGY STORAGE BOX AND ENERGY STORAGE SYSTEM

CROSS-REFERENCE TO RELATED APPLICATIONS

The present application is a continuation of International Application No. PCT/CN2024/097820, filed on Jun. 6, 2024, which claims priority to Chinese Patent Application No. 202310952652.4, filed on Jul. 31, 2023, the entire disclosures of which are incorporated herein by reference.

TECHNICAL FIELD

The present application relates to the field of energy storage boxes, and in particular, to an energy storage box and an energy storage system having the energy storage box.

BACKGROUND

In related arts, an existing energy storage container has a battery compartment and an electrical compartment. An energy storage device is arranged in the battery compartment. A power distribution box is arranged in the electrical compartment. Independent cooling devices are respectively arranged in the battery compartment and the electrical compartment. Since the cooling device for the energy storage device and the cooling device for the power distribution box are designed independently and are not associated with each other, the structure of the energy storage container is complex, manufacturing costs of the energy storage container are increased, and energy consumption of the energy storage container is also increased.

SUMMARY

The present application is intended to solve at least one of the technical problems described in related arts to a certain extent.

To this end, the present application provides an energy storage box. The energy storage box has a simple structure and low energy consumption.

According to a first aspect, an embodiment of the present application provides an energy storage box, comprising:

- a box body;
- a power distribution box and an energy storage device, wherein the power distribution box and the energy storage device are both arranged in the box body, and the energy storage device has a first medium flow path; and
- a heat exchange mechanism, wherein the heat exchange mechanism comprises a heat exchange device, at least part of the heat exchange device is arranged in the power distribution box, and the heat exchange device has a second medium flow path;
- the heat exchange mechanism further comprises a temperature adjustment device, wherein the temperature adjustment device communicates with the first medium flow path to form a first medium circulation flow path, the temperature adjustment device is connected to the second medium flow path to form a second medium circulation flow path, the first medium circulation flow path and the second medium circulation flow path comprise a heat exchange medium therein, and the temperature adjustment device is configured to adjust the temperature of the heat exchange medium.

In the above technical solution, the temperature adjustment device cooperates with the heat exchange device, so that the power distribution box and the energy storage device can share one heat exchange mechanism, which can simplify the structure of the energy storage box, thereby reducing manufacturing costs of the energy storage box. In addition, the heat exchange medium in the temperature adjustment device can heat or cool the power distribution box, which can reduce energy consumption of the energy storage box.

According to a second aspect, an embodiment of the present application further provides an energy storage system, comprising at least one energy storage box described above.

Additional aspects and advantages of the present application will be partly provided in the following description, and partly become evident in the following description or understood through the practice of the present application.

Figure 1:
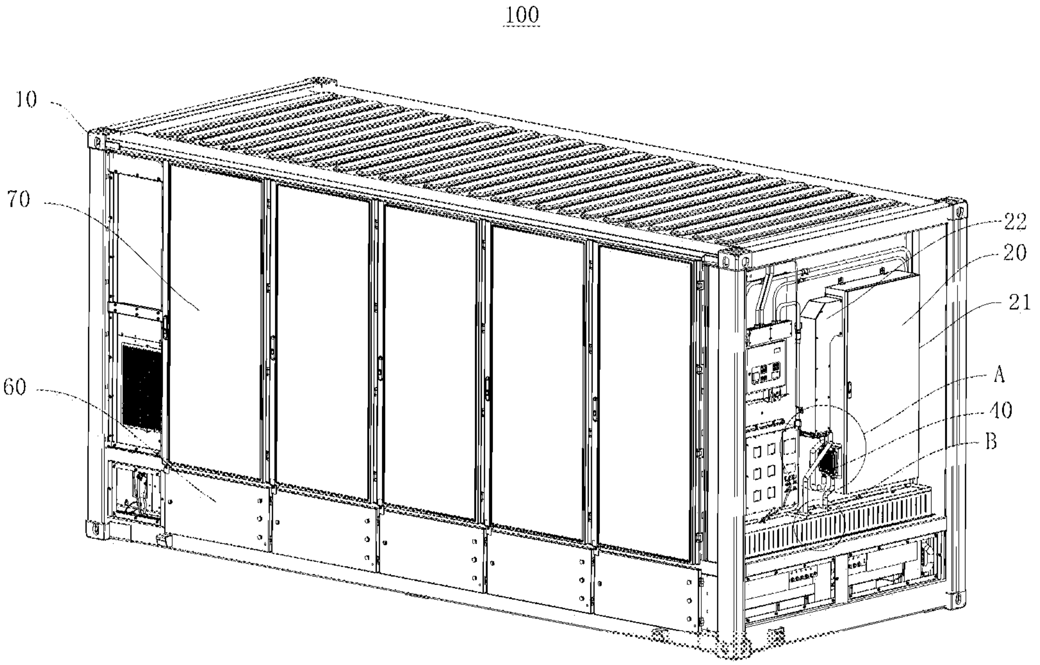
FIG. 1 is a schematic diagram of an energy storage box according to an embodiment of the present application.

REFERENCE NUMERALS energy storage box 100;
box body 10;
power distribution box 20; main box body 21; communication hole 211; first mounting hole 213; air guide portion 22;
temperature adjustment device 30;
heat exchange device 40; first heat exchange member 401; first heat sink 402; first air supply member 403; second heat exchange member 404; first communication pipeline 405; second communication pipeline 406; third communication pipeline 407; second air supply member 408;
first drive pump 50; main control box 60; energy storage device 70;
first pipeline assembly 80; first pipeline 801; second pipeline 802;
heat exchange flow path 90;
energy storage system 200; bidirectional power conversion system 201.

DESCRIPTION OF EMBODIMENTS

To make the objectives, technical solutions, and advantages of embodiments of the present application clearer, the following clearly describes the technical solutions in the embodiments of the present application with reference to the drawings in the embodiments of the present application. Clearly, the described embodiments are some but not all of the embodiments of the present application. All other embodiments obtained by those of ordinary skill in the art based on the embodiments of the present application without making creative efforts shall fall within the protection scope of the present application.

Unless otherwise defined, all technical and scientific terms used in the present application have the same meaning as commonly understood by a person skilled in the art of the present application. In the present application, the terms used in the description of the present application are only used for describing specific embodiments and are not intended to limit the present application, and the terms “comprise”, “have”, and any variations thereof in the description and claims of the present application and the above description of the drawings are intended to cover a non-exclusive inclusion. The terms “first”, “second”, and the like in the description and claims of the present application or in the drawings are used to distinguish between different objects, and are not used to describe a specific sequence or a primary-secondary relationship.

An “embodiment” in the present application means that a specific feature, structure, or characteristic described with reference to the embodiment may be included in at least one embodiment of the present application. The phrase in various places in the description does not necessarily all refer to the same embodiment, or a separate or alternative embodiment mutually exclusive of other embodiments.

In the description of the present application, it should be noted that, unless explicitly specified and defined otherwise, the terms “mount”, “couple”, “connect”, and “attach” are to be understood in a broad sense. For example, the terms may indicate a fixed connection, a detachable connection, or an integral connection, and may indicate a direct connection or an indirect connection implemented via an intermediate medium, or internal communication between two elements. Those of ordinary skill in the art can understand specific meanings of these terms in the present application according to specific situations.

The term “and/or” in the present application is only an associative relationship for describing associated objects, indicating that three relationships may be present. For example, G and/or H may indicate three cases: presence of only G; presence of both G and H; and presence of only H. In addition, the symbol “/” in the present application generally represents an “or” relationship between associated objects.

In the embodiments of the present application, the same reference numerals denote the same component, and a detailed description of the same component is omitted in different embodiments for the sake of brevity. It should be understood that the dimensions of various components, such as the thickness, length, and width, and the dimensions of an integrated device, such as the overall thickness, length, and width, in the embodiments of the present application shown in the figures are merely illustrative and should not be construed as limiting the present application.

The term “a plurality of” in the present application refers to more than two (including two).

The energy storage box of the present application may be used for placing an energy storage device. The energy storage device may be a battery. The battery may include a plurality of battery cells. The battery cell may include a lithium-ion secondary battery, a lithium-ion primary battery, a lithium-sulfur battery, a sodium-lithium ion battery, a sodium-ion battery, a magnesium-ion battery, or the like, which is not limited in the embodiments of the present application. The battery cell may be in a shape of a cylinder, a flat body, a cuboid, or the like, which is not limited in the embodiments of the present application. The battery cell is generally classified into three types according to a packaging manner: a cylindrical battery cell, a square battery cell, and a pouch battery cell, which is not limited in the embodiments of the present application.

The battery cell includes a housing, an electrode assembly, and an electrolyte. The housing is configured to accommodate the electrode assembly and the electrolyte. The electrode assembly includes a positive electrode sheet, a negative electrode sheet, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is coated on a surface of the positive electrode current collector. The positive electrode current collector not coated with the positive electrode active substance layer protrudes from the positive electrode current collector coated with the positive electrode active substance layer, and the positive electrode current collector not coated with the positive electrode active substance layer is a positive electrode lug. A lithium-ion battery is used as an example, for which, the positive electrode current collector may be made of aluminum, and the positive electrode active substance may be lithium cobalt oxide, lithium iron phosphate, ternary lithium, lithium manganate oxide, or the like. The negative electrode plate includes a negative electrode current collector and a negative electrode active substance layer. The negative electrode active substance layer is coated on a surface of the negative electrode current collector. The negative electrode current collector not coated with the negative electrode active substance layer protrudes from the negative electrode current collector coated with the negative electrode active substance layer, and the negative electrode current collector not coated with the negative electrode active substance layer is a negative electrode lug. The negative electrode current collector may be made of copper, and the negative electrode active substance may be carbon, silicon, or the like. To ensure that a large current passes through without any fusing, a plurality of positive electrode tabs are provided and stacked together, and a plurality of negative electrode tabs are provided and stacked together.

The separator may be made of polypropylene (PP), polyethylene (PE), or the like. Furthermore, the electrode assembly may be a wound structure or a laminated structure, and the embodiments of the present application are not limited thereto.

The energy storage container has a battery compartment and an electrical compartment. An energy storage device is arranged in the battery compartment. A power distribution box is arranged in the electrical compartment. Independent cooling devices are respectively arranged in the battery compartment and the electrical compartment. The cooling device in the battery compartment only dissipates heat from the energy storage device, and the cooling device in the battery compartment only dissipates heat from the power distribution box. Since the cooling device for the energy storage device and the cooling device for the power distribution box are designed independently and are not associated with each other, the structure of the energy storage container is complex, manufacturing costs of the energy storage container are increased, and energy consumption of the energy storage container is also increased.

Based on the above considerations, to solve the technical problem that the cooling device for the energy storage device and the cooling device for the power distribution box in the energy storage container are designed independently and are not associated with each other, resulting in a complex structure of the energy storage container, the present application provides an energy storage box. The energy storage box includes: a box body; a power distribution box and an energy storage device, where the power distribution box and the energy storage device are both arranged in the box body, and the energy storage device has a first medium flow path; a heat exchange mechanism, where the heat exchange mechanism includes a heat exchange device, at least part of the heat exchange device is arranged in the power distribution box, the heat exchange device has a second medium flow path, the heat exchange mechanism further includes a temperature adjustment device, the temperature adjustment device communicates with the first medium flow path to form a first medium circulation flow path, the temperature adjustment device is connected to the second medium flow path to form a second medium circulation flow path, the first medium circulation flow path and the second medium circulation flow path include a heat exchange medium therein, and the temperature adjustment device is configured to adjust the temperature of the heat exchange medium.

In the energy storage box with this structure, the temperature adjustment device cooperates with the heat exchange device, so that the power distribution box and the energy storage device can share one heat exchange mechanism, which can simplify the structure of the energy storage box, thereby reducing manufacturing costs of the energy storage box. In addition, the heat exchange medium in the temperature adjustment device can heat or cool the power distribution box, which can reduce energy consumption of the energy storage box.

Hereinafter, an energy storage box 100 according to an embodiment of the present application is described with reference to FIG. 1 to FIG. 17.

As shown in FIG. 1 to FIG. 17, an energy storage box 100 according to an embodiment of the present application includes: a box body 10; a power distribution box 20 and an energy storage device 70, where the power distribution box 20 and the energy storage device 70 are both arranged in the box body 10, and the energy storage device 70 has a first medium flow path; and a heat exchange mechanism, where the heat exchange mechanism includes a heat exchange device 40, at least part of the heat exchange device 40 is arranged in the power distribution box 20, the heat exchange device 40 has a second medium flow path, the heat exchange mechanism further includes a temperature adjustment device 30, the temperature adjustment device 30 communicates with the first medium flow path to form a first medium circulation flow path, the temperature adjustment device 30 is connected to the second medium flow path to form a second medium circulation flow path, the first medium circulation flow path and the second medium circulation flow path include a heat exchange medium therein, and the temperature adjustment device 30 is configured to adjust the temperature of the heat exchange medium.

The box body 10 may be understood as a structure having a compartment body used for placing components such as the power distribution box 20 and the energy storage device 70. The power distribution box 20 and the energy storage device 70 are both arranged in the box body 10. In some optional embodiments of the present application, there may be at least one energy storage device 70. For example, the quantity of the energy storage devices 70 may be, but is not limited to, 3, 4, 5, 6, or the like. The energy storage device 70 may be understood as a device capable of storing energy (for example, electrical energy). In some optional embodiments of the present application, the energy storage device 70 may include a battery. In some optional embodiments of the present application, the power distribution box 20 may be understood as a device used for power distribution. For example, the power distribution box 20 may be electrically or communicatively connected to the energy storage device 70. The power distribution box 20 may be configured to adjust charge and discharge rates of each energy storage device 70, so that the charge and discharge rates of each energy storage device 70 can be reasonably controlled, which is beneficial to prolonging a service life of the energy storage device 70.

The heat exchange mechanism includes the temperature adjustment device 30 and the heat exchange device 40. The temperature adjustment device 30 may be arranged in the box body 10. The energy storage device 70 has the first medium flow path. The first medium flow path has the heat exchange medium. The temperature adjustment device 30 communicates with the first medium flow path of the energy storage device 70. The temperature adjustment device 30 and the first medium flow path of the energy storage device 70 can form the first medium circulation flow path. The first medium circulation flow path includes the heat exchange medium therein. The heat exchange medium may be, but is not limited to, a liquid, such as an oil liquid, an ethylene glycol aqueous solution. The temperature adjustment device 30 can adjust the temperature of the heat exchange medium. For example, the temperature adjustment device 30 can selectively heat or cool the heat exchange medium. The heated or cooled heat exchange medium can flow into the first medium flow path and exchange heat with the energy storage device 70, to perform thermal management on the energy storage device 70. That is, the heat exchange medium in the first medium circulation flow path can be heated or cooled in the temperature adjustment device 30, and the heat exchange medium heated or cooled by the temperature adjustment device 30 can exchange heat with the energy storage device 70, to perform thermal management on the energy storage device 70.

In some optional embodiments of the present application, the temperature adjustment device 30 may communicate with the first medium flow path of the energy storage device 70 through a pipeline.

At least part of the heat exchange device 40 is arranged in the power distribution box 20, and the heat exchange device 40 can exchange heat with the power distribution box 20. The heat exchange device 40 has the second medium flow path. The second medium flow path has the heat exchange medium therein. The temperature adjustment device 30 communicates with the second medium flow path of the heat exchange device 40. The temperature adjustment device 30 and the second medium flow path of the heat exchange device 40 can form the second medium circulation flow path. The second medium circulation flow path includes the heat exchange medium therein.

The temperature adjustment device 30 can selectively heat or cool the heat exchange medium. The heated or cooled heat exchange medium can flow into the second medium flow path of the heat exchange device 40 and exchange heat with the power distribution box 20, to perform thermal management on the power distribution box 20. That is, the heat exchange medium in the second medium circulation flow path can be heated or cooled in the temperature adjustment device 30, and the heat exchange medium heated or cooled by the temperature adjustment device 30 can exchange heat with the power distribution box 20, to perform thermal management on the power distribution box 20.

In some optional embodiments of the present application, the temperature adjustment device 30 may communicate with the second medium flow path of the heat exchange device 40 through a pipeline. In some optional embodiments of the present application, the temperature adjustment device 30 may be controlled, based on but not limited to parameters such as the ambient temperature of the energy storage box 100, the temperature of the power distribution box 20, and the temperature of the energy storage device 70, to heat or cool the heat exchange medium.

In this way, the temperatures of the power distribution box 20 and the energy storage device 70 may be adjusted through one heat exchange mechanism, which can reduce the quantity of heat exchange mechanisms required to be arranged in the energy storage box 100, so that the structure of the energy storage box 100 can be simplified, and therefore, manufacturing costs of the energy storage box 100 can be reduced. In addition, the heat exchange medium in the temperature adjustment device 30 can be used for heating or cooling the energy storage device 70, and the heat exchange medium in the temperature adjustment device 30 can also be used for heating or cooling the power distribution box 20, which is beneficial to reducing energy consumption of the energy storage box 100.

In some optional embodiments of the present application, the second medium circulation flow path can be selectively open or closed. In some optional embodiments of the present application, opening or closing of the second medium circulation flow path may be controlled by a drive pump. For example, when the drive pump is working, the second medium circulation flow path is open, and when the drive pump is not working, the second medium circulation flow path is closed. There may be one drive pump, or there may be a plurality of drive pumps. In some optional embodiments of the present application, opening or closing of the second medium circulation flow path may be controlled by using a valve. The valve may be, but is not limited to, a pneumatic valve, an electrically operated valve, or the like. There may be one valve, or there may be a plurality of valves. Certainly, the drive pump and the valve may be both provided.

Furthermore, the flow rate of the heat exchange medium in the second medium circulation flow path may be controlled by controlling the rotation speed of the drive pump. The flow rate of the heat exchange medium in the second medium circulation flow path may be controlled by controlling the opening degree of the valve.

In some optional embodiments of the present application, a position for arrangement of the drive pump or the valve is not fixed. Specific optional positions for arrangement of the drive pump or the valve are described in the following optional embodiments (it should be explained that the following description is not an exhaustive list).

Figure 10:
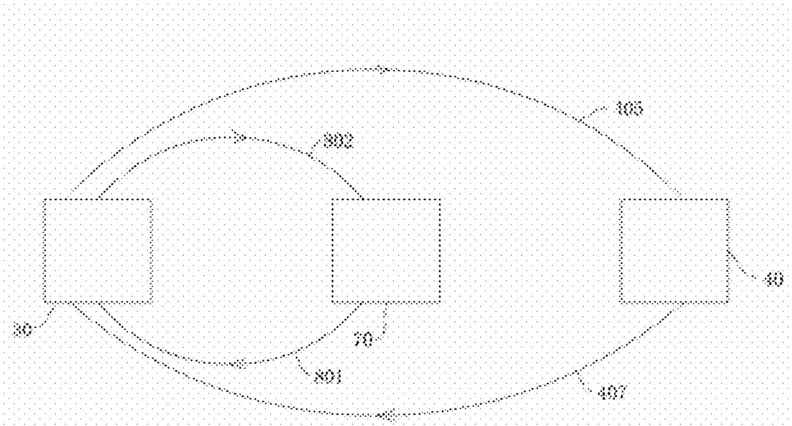
FIG. 10 is a schematic diagram of communication of a temperature adjustment device, a heat exchange device, and an energy storage device according to an embodiment of the present application.

In some optional embodiments of the present application, as shown in FIG. 10, the temperature adjustment device 30 may directly communicate with the first medium flow path of the energy storage device 70 to form the first medium circulation flow path. For example, the temperature adjustment device 30 may directly communicate with the first medium flow path of the energy storage device 70 through a first pipeline 801 and a second pipeline 802 to form the first medium circulation flow path. The temperature adjustment device 30 may have the medium inlet and the medium outlet. The first pipeline 801 may be communicated between the medium inlet of the temperature adjustment device 30 and an outlet of the first medium flow path of the corresponding energy storage device 70. The second pipeline 802 may be communicated between the medium outlet of the temperature adjustment device 30 and an inlet of the first medium flow path of the corresponding energy storage device 70.

In addition, the temperature adjustment device 30 may directly communicate with the second medium flow path of the heat exchange device 40 to form the second medium circulation flow path. For example, the temperature adjustment device 30 may directly communicate with the second medium flow path of the heat exchange device 40 through the first communication pipeline 405 and the third communication pipeline 407 to form the second medium circulation flow path. The third communication pipeline 407 may be communicated between the medium inlet of the temperature adjustment device 30 and the second medium flow path. The first communication pipeline 405 may be communicated between the medium outlet of the temperature adjustment device 30 and the second medium flow path. The drive pump and/or the valve may be arranged on the first communication pipeline 405 and/or the third communication pipeline 407. For example, the drive pump may be arranged on the first communication pipeline 405, or the drive pump may be arranged on the third communication pipeline 407.

Figure 11:
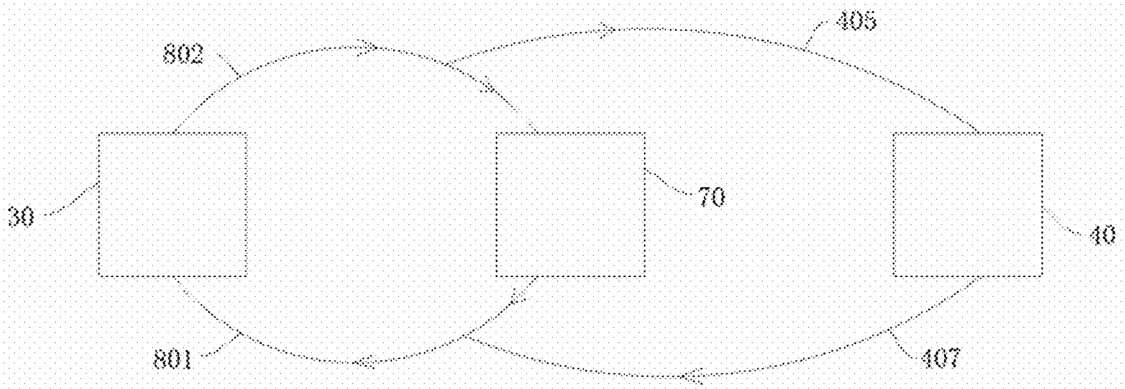
FIG. 11 is a schematic diagram of another kind of communication of a temperature adjustment device, a heat exchange device, and an energy storage device according to an embodiment of the present application.

In some optional embodiments of the present application, as shown in FIG. 11, the temperature adjustment device 30 may directly communicate with the first medium flow path of the energy storage device 70 to form the first medium circulation flow path. For example, the temperature adjustment device 30 may directly communicate with the first medium flow path of the energy storage device 70 through the first pipeline 801 and the second pipeline 802 to form the first medium circulation flow path. The temperature adjustment device 30 may have the medium inlet and the medium outlet. The first pipeline 801 may be communicated between the medium inlet of the temperature adjustment device 30 and the outlet of the first medium flow path of the corresponding energy storage device 70. The second pipeline 802 may be communicated between the medium outlet of the temperature adjustment device 30 and the inlet of the first medium flow path of the corresponding energy storage device 70.

In addition, the second medium flow path of the heat exchange device 40 may directly communicate with the first medium circulation flow path, to communicate with the temperature adjustment device 30, thereby forming the second medium circulation flow path. It may be understood that in such embodiments, part of the first medium circulation flow path is configured as part of the second medium circulation flow path.

For example, the first communication pipeline 405 may be communicated between the second pipeline 802 and the second medium flow path. The third communication pipeline 407 may be communicated between the first pipeline 801 and the second medium flow path. The drive pump and/or the valve may be arranged in the first communication pipeline 405 and/or the third communication pipeline 407. For example, the drive pump may be arranged in the first communication pipeline 405. Specifically, the drive pump may be arranged at a junction of the first communication pipeline 405 and the second pipeline 802, or the drive pump may be arranged at a junction of the first communication pipeline 405 and the second medium flow path, or the drive pump may be arranged at a junction of the third communication pipeline 407 and the first pipeline 801, or the drive pump may be arranged at a junction of the third communication pipeline 407 and the second medium flow path.

Figure 12:
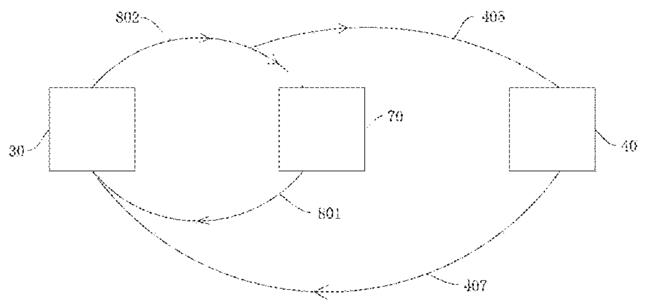
FIG. 12 is a schematic diagram of another kind of communication of a temperature adjustment device, a heat exchange device, and an energy storage device according to an embodiment of the present application.

In some optional embodiments of the present application, as shown in FIG. 12, the first pipeline 801 may be communicated between the medium inlet of the temperature adjustment device 30 and the outlet of the first medium flow path of the corresponding energy storage device 70. The second pipeline 802 may be communicated between the medium outlet of the temperature adjustment device 30 and the inlet of the first medium flow path of the corresponding energy storage device 70. The first communication pipeline 405 may be communicated between the second pipeline 802 and the second medium flow path. The third communication pipeline 407 may be communicated between the second medium flow path and the temperature adjustment device 30. The drive pump and/or the valve may be arranged on the first communication pipeline 405 and/or the third communication pipeline 407. For example, the drive pump may be arranged on the first communication pipeline 405, or the drive pump may be arranged on the third communication pipeline 407.

Figure 13:
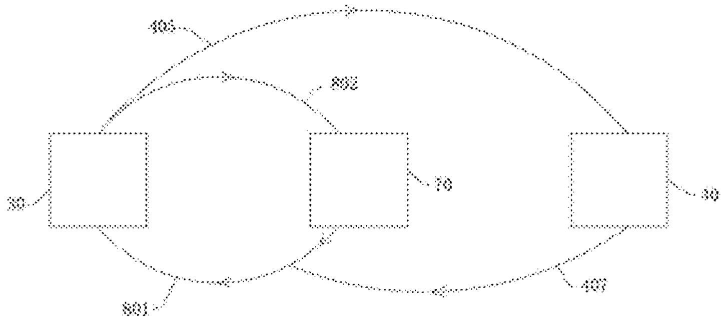
FIG. 13 is a schematic diagram of another kind of communication of a temperature adjustment device, a heat exchange device, and an energy storage device according to an embodiment of the present application.

In some optional embodiments of the present application, as shown in FIG. 13, the first pipeline 801 may be communicated between the medium inlet of the temperature adjustment device 30 and the outlet of the first medium flow path of the corresponding energy storage device 70. The second pipeline 802 may be communicated between the medium outlet of the temperature adjustment device 30 and the inlet of the first medium flow path of the corresponding energy storage device 70. The first communication pipeline 405 may be communicated between the temperature adjustment device 30 and the second medium flow path. The third communication pipeline 407 may be communicated between the second medium flow path and the first pipeline 801. The drive pump and/or the valve may be arranged on the first communication pipeline 405 and/or the third communication pipeline 407. For example, the drive pump may be arranged on the first communication pipeline 405, or the drive pump may be arranged on the third communication pipeline 407.

Figure 14:
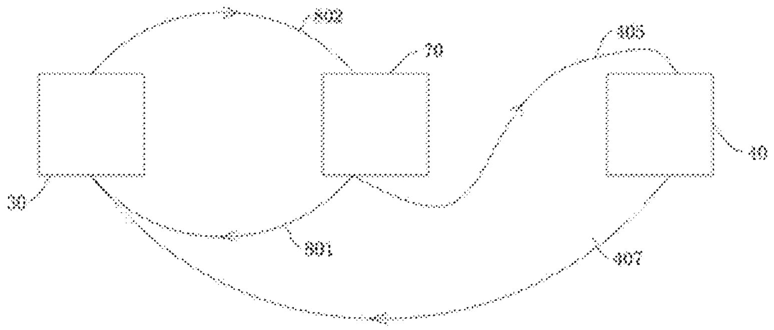
FIG. 14 is a schematic diagram of another kind of communication of a temperature adjustment device, a heat exchange device, and an energy storage device according to an embodiment of the present application.

In some optional embodiments of the present application, as shown in FIG. 14, the first pipeline 801 may be communicated between the medium inlet of the temperature adjustment device 30 and the outlet of the first medium flow path of the corresponding energy storage device 70. The second pipeline 802 may be communicated between the medium outlet of the temperature adjustment device 30 and the inlet of the first medium flow path of the corresponding energy storage device 70. The first communication pipeline 405 may be communicated between the outlet of the first medium flow path and an inlet of the second medium flow path. The third communication pipeline 407 may be communicated between an outlet of the second medium flow path and the medium inlet of the temperature adjustment device 30.

Figure 15:
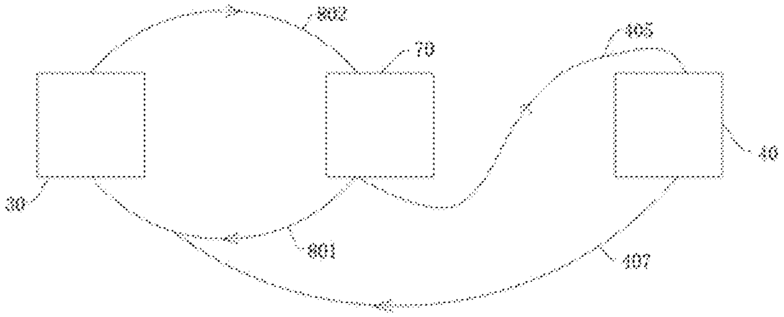
FIG. 15 is a schematic diagram of another kind of communication of a temperature adjustment device, a heat exchange device, and an energy storage device according to an embodiment of the present application.

Alternatively, as shown in FIG. 15, the first pipeline 801 may be communicated between the medium inlet of the temperature adjustment device 30 and the outlet of the first medium flow path of the corresponding energy storage device 70. The second pipeline 802 may be communicated between the medium outlet of the temperature adjustment device 30 and the inlet of the first medium flow path of the corresponding energy storage device 70. The first communication pipeline 405 may be communicated between the outlet of the first medium flow path and the inlet of the second medium flow path. The third communication pipeline 407 may be communicated between the outlet of the second medium flow path and the first pipeline 801. In this way, the heat exchange medium flowing out of the temperature adjustment device 30 may flow into the first medium flow path of the energy storage device 70 and the second medium flow path of the heat exchange device 40 in sequence, so that the temperature of the power distribution box 20 may be adjusted by using the heat exchange medium flowing out of the first medium flow path of the energy storage device 70, which is beneficial to reducing energy consumption.

In the above technical solution, the temperature adjustment device 30 cooperates with the heat exchange device 40, so that the power distribution box 20 and the energy storage device 70 can share one heat exchange mechanism, which can simplify the structure of the energy storage box 100, thereby reducing manufacturing costs of the energy storage box 100. In addition, the heat exchange medium in the temperature adjustment device 30 can heat or cool the power distribution box 20, which can reduce energy consumption of the energy storage box 100.

According to some embodiments of the present application, as shown in FIG. 11 and FIG. 12, the second medium flow path communicates with the first medium flow path, so that the heat exchange medium whose temperature is adjusted by the temperature adjustment device 30 flows into the second medium flow path through part of the first medium flow path.

In some optional embodiments of the present application, as shown in FIG. 11, the temperature adjustment device 30 may directly communicate with the first medium flow path of the energy storage device 70 through the first pipeline 801 and the second pipeline 802 to form the first medium circulation flow path. The temperature adjustment device 30 may have the medium inlet and the medium outlet. The first pipeline 801 may be communicated between the medium inlet of the temperature adjustment device 30 and the outlet of the first medium flow path of the corresponding energy storage device 70. The second pipeline 802 may be communicated between the medium outlet of the temperature adjustment device 30 and the inlet of the first medium flow path of the corresponding energy storage device 70.

In addition, the second medium flow path of the heat exchange device 40 may communicate with the first medium flow path, so that the heat exchange medium whose temperature is adjusted by the temperature adjustment device 30 flows into the second medium flow path through part of the first medium flow path. For example, the first communication pipeline 405 may be communicated between the second pipeline 802 and the second medium flow path. The third communication pipeline 407 may be communicated between the first pipeline 801 and the second medium flow path. The drive pump and/or the valve may be arranged in the first communication pipeline 405 and/or the third communication pipeline 407. For example, the drive pump may be arranged in the first communication pipeline 405. Specifically, the drive pump may be arranged at a junction of the first communication pipeline 405 and the second pipeline 802, or the drive pump may be arranged at a junction of the first communication pipeline 405 and the second medium flow path, or the drive pump may be arranged at a junction of the third communication pipeline 407 and the first pipeline 801, or the drive pump may be arranged at a junction of the third communication pipeline 407 and the second medium flow path.

In some optional embodiments of the present application, as shown in FIG. 12, the first pipeline 801 may be communicated between the medium inlet of the temperature adjustment device 30 and the outlet of the first medium flow path of the corresponding energy storage device 70. The second pipeline 802 may be communicated between the medium outlet of the temperature adjustment device 30 and the inlet of the first medium flow path of the corresponding energy storage device 70. The first communication pipeline 405 may be communicated between the second pipeline 802 and the second medium flow path. The third communication pipeline 407 may be communicated between the second medium flow path and the temperature adjustment device 30. The drive pump and/or the valve may be arranged on the first communication pipeline 405 and/or the third communication pipeline 407. For example, the drive pump may be arranged on the first communication pipeline 405, or the drive pump may be arranged on the third communication pipeline 407.

In the above technical solution, the second medium flow path communicates with the first medium flow path, so that the heat exchange medium whose temperature is adjusted by the temperature adjustment device 30 flows into the second medium flow path through part of the first medium flow path, which is beneficial to saving part of pipelines, thereby saving materials and reducing costs, and is beneficial to reducing the volume of the entire medium flow path and saving space.

In some optional embodiments of the present application, as shown in FIG. 14 and FIG. 15, the second medium flow path communicates with the first medium flow path, so that the heat exchange medium whose temperature is adjusted by the temperature adjustment device 30 flows into the second medium flow path through the first medium flow path.

For example, as shown in FIG. 14, the first pipeline 801 may be communicated between the medium inlet of the temperature adjustment device 30 and an outlet of the first medium flow path of the corresponding energy storage device 70. The second pipeline 802 may be communicated between the medium outlet of the temperature adjustment device 30 and an inlet of the first medium flow path of the corresponding energy storage device 70. The first communication pipeline 405 may be communicated between the outlet of the first medium flow path and the inlet of the second medium flow path. The third communication pipeline 407 may be communicated between the outlet of the second medium flow path and the medium inlet of the temperature adjustment device 30.

For example, as shown in FIG. 15, the first pipeline 801 may be communicated between the medium inlet of the temperature adjustment device 30 and the outlet of the first medium flow path of the corresponding energy storage device 70. The second pipeline 802 may be communicated between the medium outlet of the temperature adjustment device 30 and the inlet of the first medium flow path of the corresponding energy storage device 70. The first communication pipeline 405 may be communicated between the outlet of the first medium flow path and the inlet of the second medium flow path. The third communication pipeline 407 may be communicated between the outlet of the second medium flow path and the first pipeline 801. In this way, the heat exchange medium flowing out of the temperature adjustment device 30 may flow into the first medium flow path of the energy storage device 70 and the second medium flow path of the heat exchange device 40 in sequence, so that the temperature of the power distribution box 20 may be adjusted by using the heat exchange medium flowing out of the first medium flow path of the energy storage device 70, which is beneficial to reducing energy consumption.

In some optional embodiments of the present application, as shown in FIG. 14, the first pipeline 801 may be communicated between the medium inlet of the temperature adjustment device 30 and the outlet of the first medium flow path of the corresponding energy storage device 70. The second pipeline 802 may be communicated between the medium outlet of the temperature adjustment device 30 and the inlet of the first medium flow path of the corresponding energy storage device 70. The first communication pipeline 405 may be communicated between the outlet of the first medium flow path and the inlet of the second medium flow path. The third communication pipeline 407 may be communicated between the outlet of the second medium flow path and the medium inlet of the temperature adjustment device 30.

In such embodiments, since an internal flow path of the temperature adjustment device 30 communicates with the first medium flow path of the energy storage device 70 to form the first medium circulation flow path, the internal flow path of the temperature adjustment device 30 may be understood as part of the first medium circulation flow path. In addition, since the internal flow path of the temperature adjustment device 30 communicates with the second medium flow path of the heat exchange device 40 to form the second medium circulation flow path, the internal flow path of the temperature adjustment device 30 may be understood as part of the second medium circulation flow path. Therefore, in such embodiments, it may be understood that part of the first medium circulation flow path is configured as part of the second medium circulation flow path.

Figure 2:
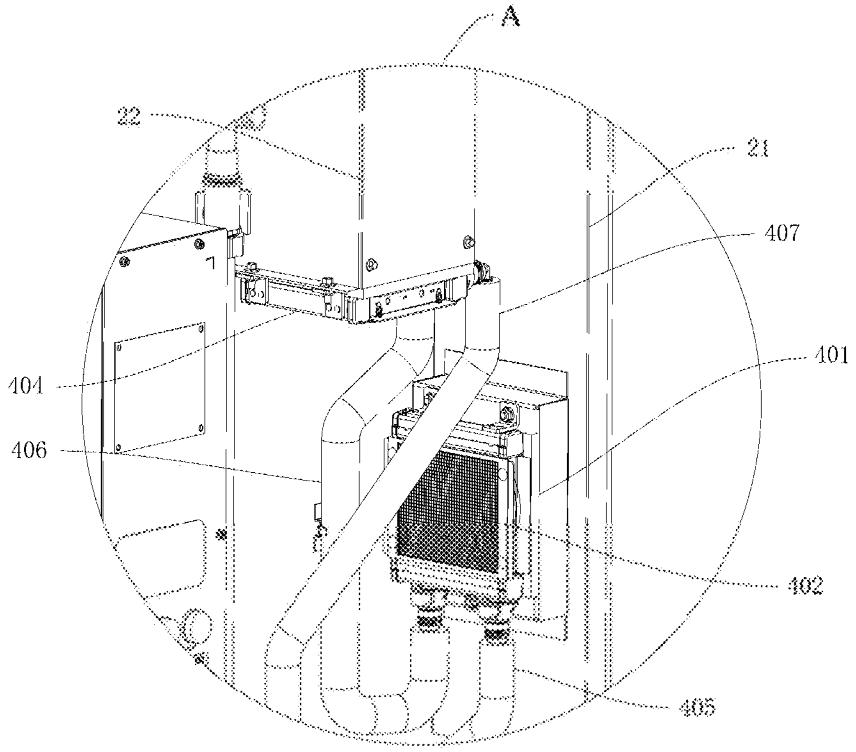
FIG. 2 is an enlarged view of A in FIG. 1.

According to some embodiments of the present application, as shown in FIG. 2, the heat exchange device 40 includes: a first heat exchange member 401. A first medium flow channel is formed in the first heat exchange member 401 and the first heat exchange member is attached to the power distribution box 20. The first medium flow channel is formed as at least part of the second medium flow path. The first medium flow channel communicates with the temperature adjustment device 30 to form the second medium circulation flow path.

The first medium flow channel is formed in the first heat exchange member 401. The first medium flow channel has the heat exchange medium therein. The first heat exchange member 401 may be attached to the power distribution box 20. In some optional embodiments of the present application, the first heat exchange member 401 may be attached to a side wall of the power distribution box 20. For example, the first heat exchange member 401 may be attached to an outer surface of the side wall of the power distribution box 20. The first heat exchange member 401 can exchange heat with the power distribution box 20 to perform thermal management on the power distribution box 20. The first medium flow channel may be formed as at least part of the second medium flow path. For example, the first medium flow channel may be formed as part of the second medium flow path, or the first medium flow channel may be formed as the second medium flow path. The first medium flow channel may be arranged to communicate with the temperature adjustment device 30. The temperature adjustment device 30 and the first medium flow channel of the first heat exchange member 401 may form the second medium circulation flow path.

When the second medium circulation flow path is open, the heated or cooled heat exchange medium can flow out of the temperature adjustment device 30 and flow into the first medium flow channel through a pipeline to exchange heat with the power distribution box 20, to perform thermal management on the power distribution box 20.

In the above technical solution, the first medium flow channel is formed as at least part of the second medium flow path, so that the temperature of the power distribution box 20 can be adjusted by using the heat exchange medium heated or cooled by the temperature adjustment device 30, which is beneficial to maintaining the power distribution box 20 within a suitable temperature range for a long time and is beneficial to increasing the service life of the power distribution box 20. In addition, the first heat exchange member 401 is attached to the power distribution box 20, so that heat exchange efficiency between the first heat exchange member 401 and the power distribution box 20 can be improved, which is beneficial to quickly adjusting the temperature of the power distribution box 20, and the power distribution box 20 and the energy storage device 70 can share one heat exchange mechanism, which can simplify the structure of the energy storage box 100.

According to some embodiments of the present application, the heat exchange device 40 further includes: a first heat sink 402. The first heat sink 402 is arranged on the first heat exchange member 401 to dissipate heat from the first heat exchange member 401.

The first heat sink 402 may be attached to the first heat exchange member 401. In some optional embodiments of the present application, the first heat sink 402 and the first heat exchange member 401 may be stacked in the thickness direction of the first heat exchange member 401. For example, the first heat sink 402 may be arranged to be attached to a surface of the first heat exchange member 401 away from the power distribution box 20. The first heat sink 402 may be provided with a plurality of heat exchange fins, so that a contact area with air can be increased, which is beneficial to dissipating heat from the first heat exchange member 401.

In some optional embodiments of the present application, the first heat sink 402 may have a heat dissipation flow channel therein. The heat dissipation flow channel may be arranged to communicate with the first medium flow channel in the first heat exchange member 401, which is also beneficial to dissipating heat from the first heat exchange member 401.

In the above technical solution, arrangement of the first heat sink 402 is beneficial to dissipating heat from the first heat exchange member 401, so that the temperature of the power distribution box 20 can be quickly adjusted, which is beneficial to maintaining the power distribution box 20 within a suitable temperature range for a long time, and is beneficial to increasing the service life of the power distribution box 20.

According to some embodiments of the present application, the heat exchange device 40 further includes: a first air supply member 403. The first air supply member 403 is adapted to blow air toward the first heat exchange member 401.

The first air supply member 403 may be configured as, but not limited to, a fan, a blower, etc. The first air supply member 403 may be arranged close to the first heat exchange member 401. The first air supply member 403 can blow air toward the first heat exchange member 401 to increase the air flow speed around the first heat exchange member 401, thereby being beneficial to dissipating heat from the first heat exchange member 401.

Figure 5:
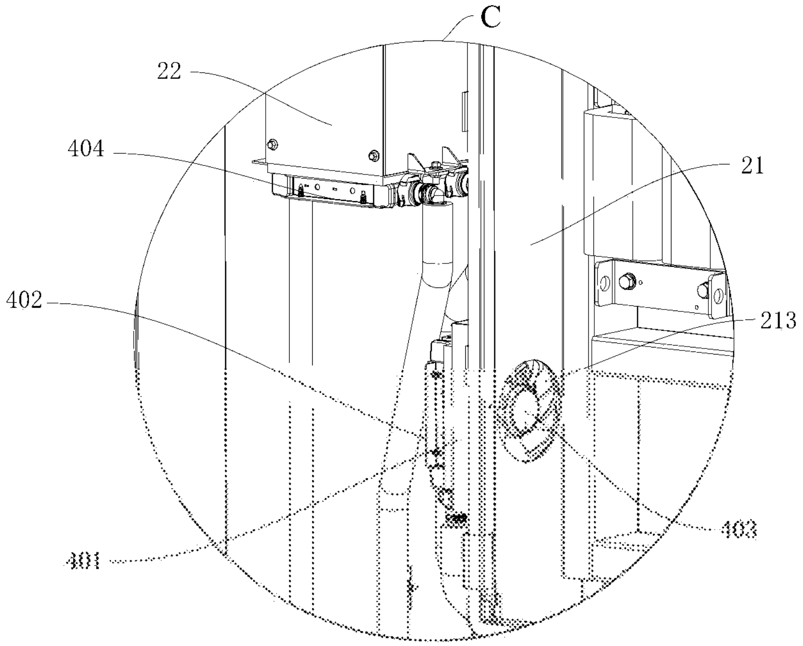
FIG. 5 is an enlarged view of C in FIG. 4.

In some optional embodiments of the present application, as shown in FIG. 2 and FIG. 5, the first air supply member 403 and the first heat exchange member 401 may be stacked in the thickness direction of the first heat exchange member 401. For example, the first air supply member 403 may be arranged on a side of the first heat exchange member 401 close to the power distribution box 20. In some optional embodiments of the present application, as shown in FIG. 5, a first mounting hole 213 may be provided in a side wall of the power distribution box 20. At least part of the structure of the first air supply member 403 may be arranged in the first mounting hole 213, so that the first heat exchange member 401 can be attached to the power distribution box 20, which is beneficial to quickly adjusting the temperature of the power distribution box 20.

In the above technical solution, arrangement of the first air supply member 403 can increase the air flow speed around the first heat exchange member 401, which is beneficial to dissipating heat from the first heat exchange member 401, so that the temperature of the power distribution box 20 can be quickly adjusted, which is beneficial to maintaining the power distribution box 20 within a suitable temperature range for a long time, and is beneficial to increasing the service life of the power distribution box 20.

In some optional embodiments of the present application, as shown in FIG. 2 and FIG. 5, the heat exchange device 40 may include: a first heat sink 402, a first heat exchange member 401, and a first air supply member 403. The first heat sink 402, the first air supply member 403, and the first heat exchange member 401 may be stacked in the thickness direction of the first heat exchange member 401. In addition, the first heat exchange member 401 may be arranged between the first heat sink 402 and the first air supply member 403. For example, the first heat sink 402 may be arranged to be attached to a surface of the first heat exchange member 401 away from the power distribution box 20. The first air supply member 403 may be arranged on a side of the first heat exchange member 401 close to the power distribution box 20. In this way, the first heat sink 402 and the first air supply member 403 may be arranged at reasonable positions, which is beneficial to dissipating heat from the first heat exchange member 401.

According to some embodiments of the present application, as shown in FIG. 2 and FIG. 5, the heat exchange device 40 further includes: a second heat exchange member 404. A second medium flow channel is formed in the second heat exchange member 404 and the second heat exchange member is arranged on the power distribution box 20. The second medium flow channel is communicated between the first medium flow channel and the temperature adjustment device 30, to communicate the first medium flow channel with the temperature adjustment device 30.

The second medium flow channel may be formed in the second heat exchange member 404. The second medium flow channel has the heat exchange medium therein. The second heat exchange member 404 may be arranged on the power distribution box 20. The second medium flow channel may be connected between the first medium flow channel and the temperature adjustment device 30, to communicate the first medium flow channel with the temperature adjustment device 30. The second heat exchange member 404 can exchange heat with the power distribution box 20. In addition, the second heat exchange member 404 and the first heat exchange member 401 may be arranged at different positions of the power distribution box 20.

In some optional embodiments of the present application, the second medium flow channel may be arranged upstream of the first medium flow channel. That is, the heat exchange medium heated or cooled by the temperature adjustment device 30 can first flow into the second medium flow channel, and then flow from the second medium flow channel into the first medium flow channel. In some optional embodiments of the present application, the second medium flow channel may be arranged downstream of the first medium flow channel. That is, the heat exchange medium heated or cooled by the temperature adjustment device 30 can first flow into the first medium flow channel, and then flow from the first medium flow channel into the second medium flow channel.

In addition, the first medium flow channel and the second medium flow channel may be formed as at least part of the second medium flow path. The temperature adjustment device 30, the first medium flow channel of the first heat exchange member 401, and the second medium flow channel of the second heat exchange member 404 may form the second medium circulation flow path.

In some optional embodiments of the present application, the second medium flow channel may communicate with the first medium flow channel through a pipeline. The second medium flow channel may communicate with the temperature adjustment device 30 through a pipeline. The first medium flow channel may communicate with the temperature adjustment device 30 through a pipeline.

For example, as shown in FIG. 2, the first heat exchange member 401 may have a first inlet and a first outlet. The first inlet and the first outlet both communicate with the first medium flow channel. The second heat exchange member 404 may have a second inlet and a second outlet. The second inlet and the second outlet both communicate with the second medium flow channel. Taking the second medium flow channel arranged downstream of the first medium flow channel as an example, the first inlet of the first heat exchange member 401 may communicate with the temperature adjustment device 30 through a first communication pipeline 405. The first outlet of the first heat exchange member 401 may communicate with the second inlet of the second heat exchange member 404 through a second communication pipeline 406. The second outlet of the second heat exchange member 404 may communicate with the temperature adjustment device 30 through a third communication pipeline 407.

In the above technical solution, the second heat exchange member 404 is arranged, so that the temperature of the power distribution box 20 can be adjusted by using the heat exchange medium heated or cooled by the temperature adjustment device 30. In addition, the second heat exchange member 404 cooperates with the first heat exchange member 401, so that the temperature of the power distribution box 20 can be adjusted at different positions, which is beneficial to quickly adjusting the temperature of the power distribution box 20. Moreover, the power distribution box 20 and the energy storage device 70 share one heat exchange mechanism, which can simplify the structure of the energy storage box 100, thereby reducing manufacturing costs of the energy storage box 100.

According to some embodiments of the present application, the power distribution box 20 has an air guide channel communicating with the interior of the power distribution box 20. The second heat exchange member 404 is arranged in the air guide channel to exchange heat with air in the air guide channel.

The interior of the power distribution box 20 communicates with the air guide channel. That is, the air in the power distribution box 20 can flow into the air guide channel. The air in the air guide channel can flow into the power distribution box 20. The second heat exchange member 404 may be arranged in the air guide channel. The second heat exchange member 404 can exchange heat with the air in the air guide channel to perform thermal management on the power distribution box 20.

In the above technical solution, the second heat exchange member 404 is arranged in the air guide channel communicating with the interior of the power distribution box 20, so that the second heat exchange member 404 can exchange heat with the air in the air guide channel, and therefore, reliable thermal management can be performed on the power distribution box 20, which is beneficial to maintaining the power distribution box 20 within a suitable temperature range for a long time, and is beneficial to increasing the service life of the power distribution box 20.

According to some embodiments of the present application, the air guide channel has a first open end and a second open end. The first open end communicates with the interior of the power distribution box 20. The second heat exchange member 404 is arranged at the second open end.

The interior of the power distribution box 20 may communicate with the air guide channel through the first open end. The second heat exchange member 404 may be arranged at the second open end. In some optional embodiments of the present application, the second open end may be located at any position of the air guide channel.

In some optional embodiments of the present application, the second heat exchange member 404 may close the second open end. In some optional embodiments of the present application, the second heat exchange member 404 may not close the second open end.

In some optional embodiments of the present application, in an extension direction of the air guide channel, the first open end and the second open end may be respectively located at two ends of the air guide channel.

In some optional embodiments of the present application, the second open end may be arranged close to the first heat exchange member 401, which is beneficial to shortening the length of a pipeline between the first heat exchange member 401 and the second heat exchange member 404.

In the above technical solution, the second heat exchange member 404 is arranged at the second open end of the air guide channel, so that the second heat exchange member 404 may be arranged at a reasonable position, and therefore, reliable thermal management can be performed on the power distribution box 20, which is beneficial to maintaining the power distribution box 20 within a suitable temperature range for a long time, and is beneficial to increasing the service life of the power distribution box 20.

According to some embodiments of the present application, as shown in FIG. 1, FIG. 2 and FIG. 5, the power distribution box 20 includes a main box body 21 and an air guide portion 22 connected to each other. The air guide portion 22 is located outside the main box body 21 and forms an air guide channel. The main box body 21 has a communication hole 211. The communication hole 211 communicates the air guide channel with the main box body 21.

The main box body 21 may be connected to the air guide portion 22, and the air guide portion 22 may be located outside the main box body 21. In some optional embodiments of the present application, the air guide portion 22 may be connected to a side wall of the main box body 21, the first heat exchange member 401 may be arranged on a side wall of the main box body 21, and the air guide portion 22 and the first heat exchange member 401 may be located on the same side of the main box body 21, so that the air guide portion 22 and the first heat exchange member 401 may be arranged at reasonable positions, and the space of the energy storage box 100 may be fully used.

Figure 6:
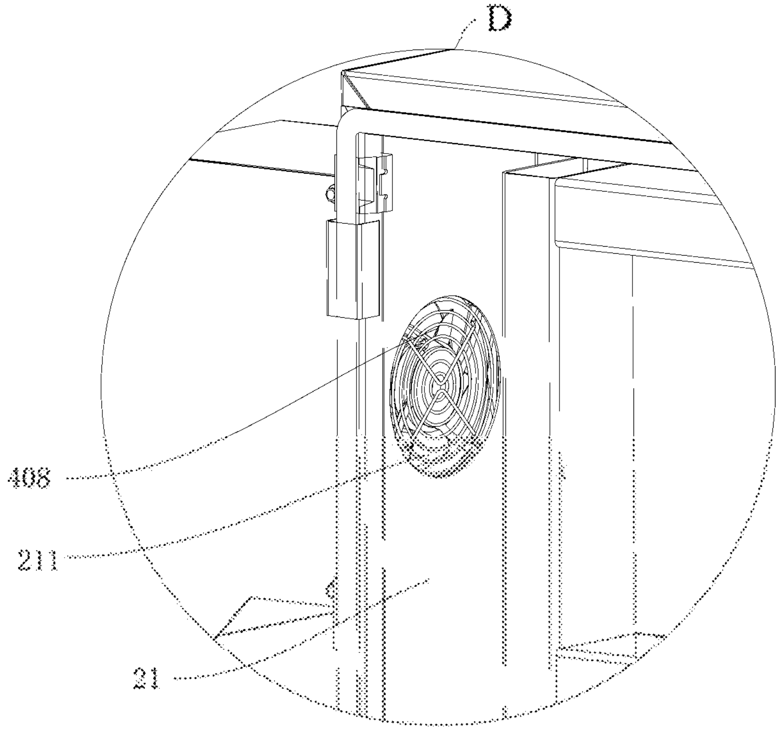
FIG. 6 is an enlarged view of D in FIG. 4.

The air guide portion 22 may form the air guide channel. The main box body 21 may have the communication hole 211 (as shown in FIG. 6). The communication hole 211 may communicate the air guide channel with the main box body 21. That is, the air guide channel may communicate with the internal space of the main box body 21 through the communication hole 211, and the second heat exchange member 404 may be arranged on the air guide portion 22 to exchange heat with air in the air guide channel. In some optional embodiments of the present application, the air guide portion 22 may have a second mounting hole. The second heat exchange member 404 may be arranged in the second mounting hole. Alternatively, in some optional embodiments of the present application, the second heat exchange member 404 may be arranged on an outer wall surface of the air guide portion 22.

In the above technical solution, the communication hole 211 is provided in the main box body 21, so that the air guide channel of the air guide portion 22 can communicate with the internal space of the main box body 21, and therefore, thermal management can be performed on the power distribution box 20 through the second heat exchange member 404 arranged on the air guide portion 22, which is beneficial to maintaining the power distribution box 20 within a suitable temperature range for a long time, and is beneficial to increasing the service life of the power distribution box 20.

According to some embodiments of the present application, as shown in FIG. 6, the energy storage box 100 further includes: a second air supply member 408. The second air supply member 408 is arranged on the main box body 21 and corresponds to the communication hole 211. The second air supply member 408 is adapted to draw air from the main box body 21 into the air guide channel.

The second air supply member 408 may be configured as, but not limited to, a fan, a blower, etc. The second air supply member 408 may be arranged on the main box body 21, and the second air supply member 408 may be arranged corresponding to the communication hole 211. When the second air supply member 408 is working, the air in the main box body 21 can be drawn into the air guide channel. In an embodiment where the air guide channel does not directly communicate with the outside of the main box body 21, when the second air supply member 408 is working, air in the main box body 21 can be drawn into the air guide channel, and the second heat exchange member 404 can exchange heat with the air in the air guide channel to adjust the temperature of the air in the air guide channel, so that thermal management can be performed on the power distribution box 20. In addition, due to the second air supply member 408, the air in the main box body 21 and the air guide channel can flow, that is, the second air supply member 408 can play a role in flow disturbance, so that the second heat exchange member 404 can contact more air, and therefore, reliable thermal management can be performed on the power distribution box 20.

In an embodiment where the air guide channel directly communicates with the outside of the main box body 21, when the second air supply member 408 is working, air in the main box body 21 can be drawn into the air guide channel and discharged from the main box body 21, and the second heat exchange member 404 can exchange heat with the air discharged from the main box body 21 to reduce influence of the discharged air on the temperature of the main box body 21. It may be understood that the discharged air may influence the temperature of the main box body 21 outside the main box body 21.

In the above technical solution, the second air supply member 408 is arranged, so that the air in the main box body 21 can be drawn into the air guide channel and discharged from the main box body 21, and the second air supply member 408 can increase the air flow speed, so that the second heat exchange member 404 can contact more air, and therefore, reliable thermal management can be performed on the power distribution box 20.

Figure 3:
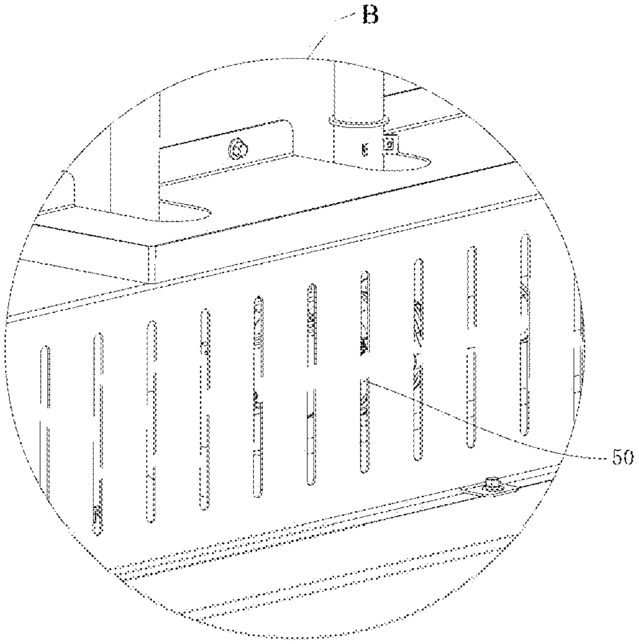
FIG. 3 is an enlarged view of B in FIG. 1.
Figure 7:
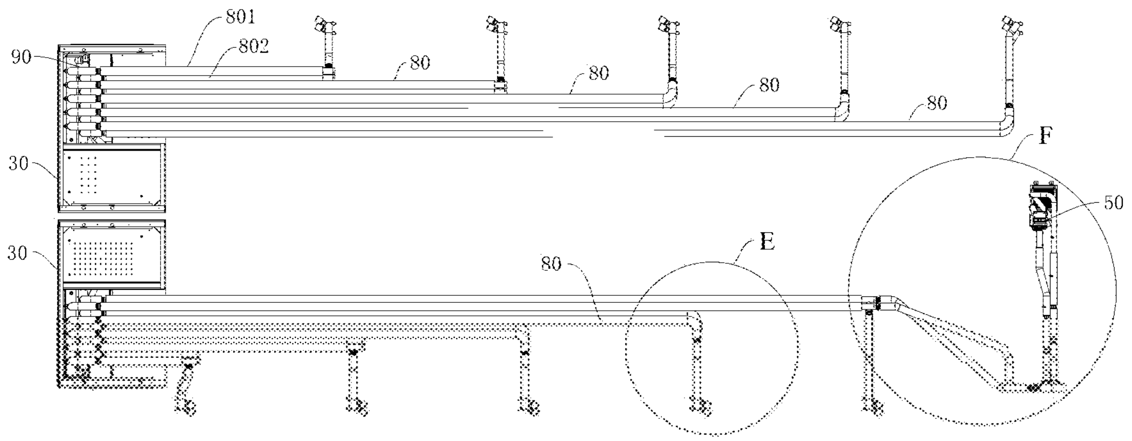
FIG. 7 is a schematic diagram of assembly of a heat exchange mechanism and a first pipeline assembly according to an embodiment of the present application.
Figure 9:
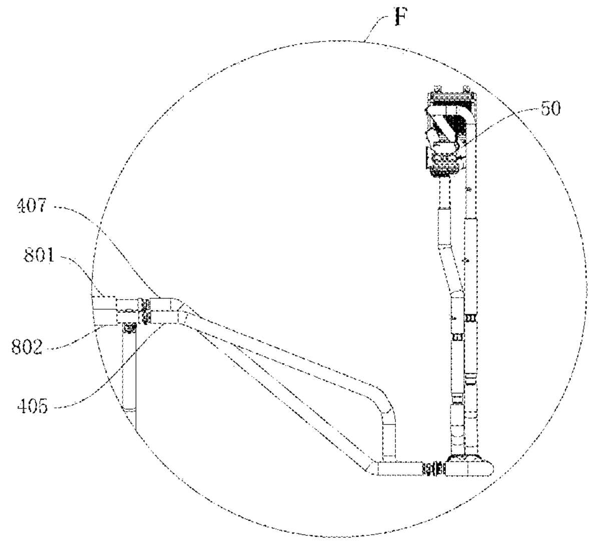
FIG. 9 is an enlarged view of F in FIG. 7.

According to some embodiments of the present application, as shown in FIG. 3, FIG. 7 and FIG. 9, the energy storage box 100 further includes: a first drive pump 50. The first drive pump 50 is connected between the second medium flow path and the temperature adjustment device 30, to drive the heat exchange medium to circulate in the second medium circulation flow path.

In some optional embodiments of the present application, the second medium flow path and the temperature adjustment device 30 may communicate with each other through a pipeline. Taking the second medium flow channel arranged downstream of the first medium flow channel as an example, as shown in FIG. 5, the first inlet of the first heat exchange member 401 may communicate with the temperature adjustment device 30 through the first communication pipeline 405. The first outlet of the first heat exchange member 401 may communicate with the second inlet of the second heat exchange member 404 through the second communication pipeline 406. The second outlet of the second heat exchange member 404 may communicate with the temperature adjustment device 30 through the third communication pipeline 407. The first drive pump 50 may be connected between the second medium flow path and the temperature adjustment device 30. For example, the first drive pump 50 may be arranged in the first communication pipeline 405, or the first drive pump 50 may be arranged in the third communication pipeline 407. When the first drive pump 50 is working, the heat exchange medium can be driven to circulate in the second medium circulation flow path. Specifically, when the first drive pump 50 is working, the heat exchange medium can be driven to flow from the temperature adjustment device 30 into the first heat exchange member 401 and the second heat exchange member 404 in sequence, and then the heat exchange medium may flow from the second heat exchange member 404 back to the temperature adjustment device 30. It may be understood that, in such embodiments, the second medium flow path, the third communication pipeline 407, the first communication pipeline 405, and the temperature adjustment device 30 may jointly form the second medium circulation flow path, and the second communication pipeline 406 may be part of the second medium flow path.

In some optional embodiments of the present application, opening or closing of the second medium circulation flow path may be controlled by a first drive pump 50. For example, when the first drive pump 50 is working, the second medium circulation flow path is open, and when the first drive pump 50 is not working, the second medium circulation flow path is closed.

In the above technical solution, the first drive pump 50 is arranged and connected between the second medium flow path and the temperature adjustment device 30, so that the heat exchange medium can be driven to circulate in the second medium circulation flow path, and therefore, reliable thermal management can be performed on the power distribution box 20, and the power distribution box 20 and the energy storage device 70 can share one heat exchange mechanism, which can simplify the structure of the energy storage box 100, and is beneficial to reducing manufacturing costs of the energy storage box 100.

According to some embodiments of the present application, the energy storage box 100 further includes: a second drive pump. The second drive pump is arranged in the first medium circulation flow path to drive the heat exchange medium to circulate in the first medium circulation flow path.

The second drive pump may be arranged in the first medium circulation flow path. In some optional embodiments of the present application, the temperature adjustment device 30 may communicate with the first medium flow path of the energy storage device 70 through a pipeline, and the second drive pump may be arranged in the pipeline, or the second drive pump may be arranged in the first medium flow path, or the second drive pump may be arranged in the temperature adjustment device 30. In addition, the second drive pump may drive the heat exchange medium to circulate in the first medium circulation flow path. Specifically, when the second drive pump is working, the heat exchange medium may be driven to flow from the temperature adjustment device 30 into the first medium flow path, and then the heat exchange medium may flow from the first medium flow path back to the temperature adjustment device 30.

In the above technical solution, the second drive pump is arranged in the first medium circulation flow path, so that the heat exchange medium can be driven to circulate in the first medium circulation flow path, and therefore, reliable thermal management can be performed on the energy storage device 70, which is beneficial to maintaining the energy storage device 70 within a suitable temperature range for a long time, and is beneficial to increasing the service life of the energy storage device 70. Moreover, the power distribution box 20 and the energy storage device 70 can share one heat exchange mechanism, which can simplify the structure of the energy storage box 100 and is beneficial to reducing manufacturing costs of the energy storage box 100.

According to some embodiments of the present application, a plurality of second drive pumps and a plurality of first medium circulation flow paths are provided. The plurality of second drive pumps are connected to the plurality of first medium circulation flow paths in a one-to-one correspondence.

Specifically, there may be at least two second drive pumps and at least two first medium circulation flow paths, and the quantity of the second drive pumps may be the same as the quantity of the first medium circulation flow paths. The at least two second drive pumps and the at least two first medium circulation flow paths may be connected in a one-to-one correspondence. For example, there may be five second drive pumps. There may also be five first medium circulation flow paths. The five second drive pumps and the five first medium circulation flow paths may be connected in a one-to-one correspondence. Each second drive pump may drive the heat exchange medium to circulate in the corresponding first medium circulation flow path.

In some optional embodiments of the present application, the quantity of the first medium circulation flow paths may be the same as the quantity of the energy storage devices 70. Specifically, each energy storage device 70 has the first medium flow path. The first medium flow path of each energy storage device 70 may communicate with the temperature adjustment device 30 through a pipeline. The first medium flow path, the pipeline in communication with the first medium flow path, and the temperature adjustment device 30 may form the first medium circulation flow path. The second drive pump can drive the heat exchange medium to circulate in the corresponding first medium circulation flow path.

In some optional embodiments of the present application, the ratio of the quantity of the first medium circulation flow paths to the quantity of the second drive pumps may be a positive integer, for example, but is not limited to, 2, 3, or the like, so that the heat exchange medium in the plurality of first medium circulation flow paths may be driven by one second drive pump, which is beneficial to reducing the quantity of second drive pumps, and is beneficial to reducing costs of the energy storage box 100.

In the above technical solution, a plurality of second drive pumps and a plurality of first medium circulation flow paths are provided, and the plurality of second drive pumps and the plurality of first medium circulation flow paths are connected in a one-to-one correspondence, so that the heat exchange medium in the plurality of first medium circulation flow paths may be respectively driven by the plurality of second drive pumps. It should be understood that temperatures of the energy storage devices 70 may be different. Either working of each second drive pump is controlled in a targeted manner, or output power of each second drive pump is controlled in a targeted manner, so that it is beneficial to implementing accurate temperature control on each energy storage device 70, and is beneficial to improving temperature consistency among the plurality of energy storage devices 70 in the energy storage box 100.

Figure 4:
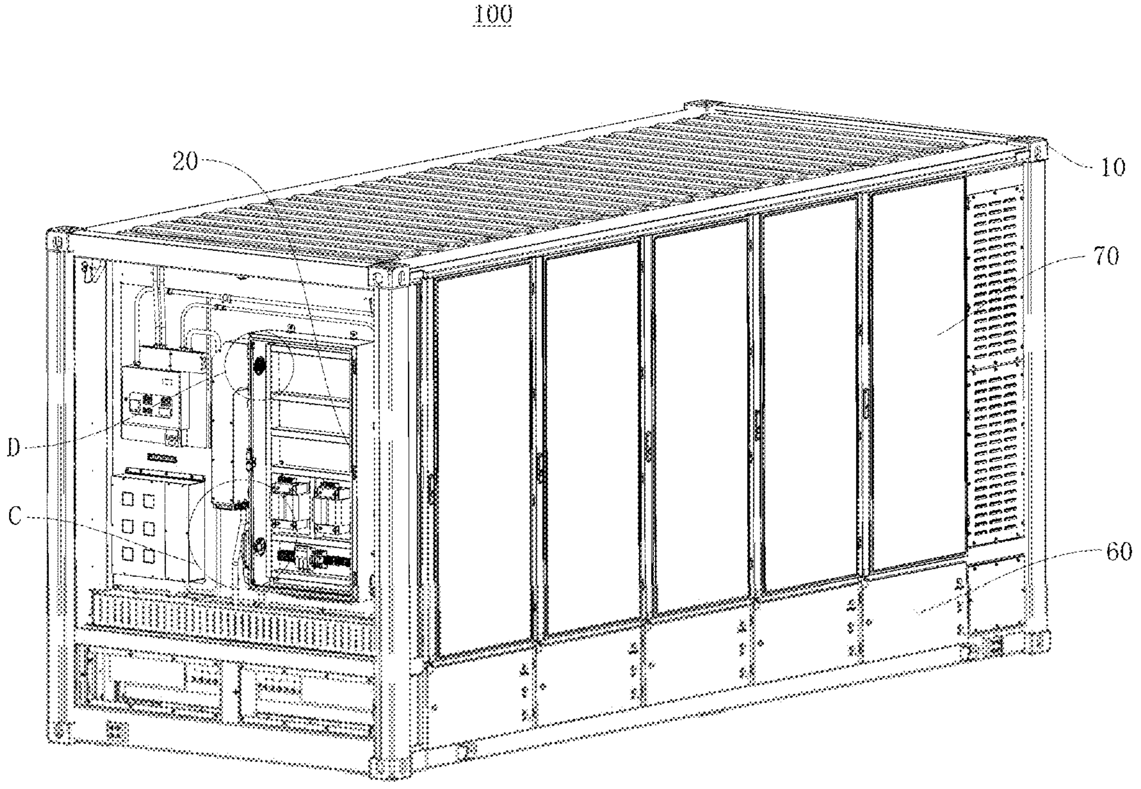
FIG. 4 is a schematic diagram of an energy storage box from another perspective according to an embodiment of the present application.

According to some embodiments of the present application, as shown in FIG. 1 and FIG. 4, the energy storage box 100 further includes: a main control box 60. The main control box 60 is connected to the energy storage device 70 to control the energy storage device 70. The main control box 60 has a flow disturbance member therein, so that air flows in the main control box 60.

The main control box 60 may be arranged in the box body 10. The main control box 60 may be connected to the energy storage device 70 in a manner including, but not limited to, an electrical connection, a communication connection, or the like. The main control box 60 can control the energy storage device 70. The flow disturbance member may be arranged in the main control box 60. The flow disturbance member may be configured as, but not limited to, a fan, a blower, or the like. When the flow disturbance member is working, the air can be driven to flow in the main control box 60 to adjust the temperature of the main control box 60.

In some optional embodiments of the present application, a plurality of main control boxes 60 and a plurality of energy storage devices 70 may be provided, and the plurality of main control boxes 60 are connected to the plurality of energy storage devices 70 in a one-to-one correspondence to control the corresponding energy storage devices 70.

In the above technical solution, the flow disturbance member is arranged in the main control box 60, so that the air can flow in the main control box 60, and therefore, the temperature of the main control box 60 can be adjusted to be within a suitable working range, thereby reducing a probability of failure of the energy storage box 100.

According to some embodiments of the present application, the temperature adjustment device 30 has a medium inlet and a medium outlet. The first medium flow path is communicated between the medium inlet and the medium outlet to form the first medium circulation flow path.

The temperature adjustment device 30 can heat or cool the heat exchange medium. The medium inlet of the temperature adjustment device 30 communicates with the first medium flow path, the medium outlet of the temperature adjustment device 30 communicates with the first medium flow path, and the first medium flow path is communicated between the medium inlet and the medium outlet to form the first medium circulation flow path. The second drive pump may drive the heat exchange medium to circulate in the first medium circulation flow path. Specifically, when the second drive pump is working, the heat exchange medium can be driven to flow from the medium outlet of the temperature adjustment device 30 into the first medium flow path, and then the heat exchange medium in the first flow path medium can flow back to the temperature adjustment device 30 through the medium inlet of the temperature adjustment device 30.

In the above technical solution, the first medium flow path is communicated between the medium inlet of the temperature adjustment device 30 and the medium outlet of the temperature adjustment device 30, so that the heat exchange medium can circulate between the temperature adjustment device 30 and the first medium flow path, which is beneficial to improving thermal management efficiency of the temperature adjustment device 30.

Figure 8:
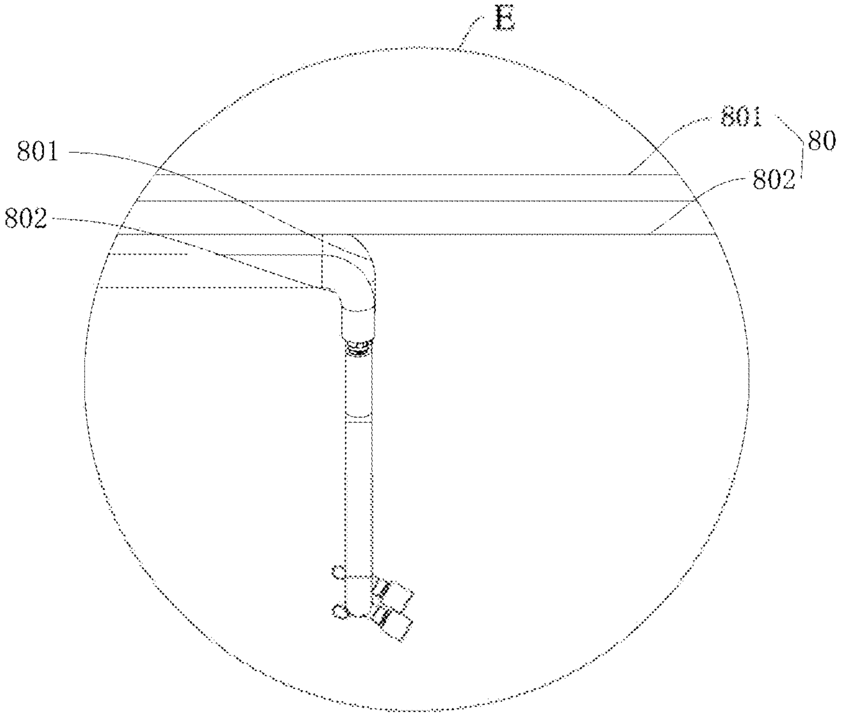
FIG. 8 is an enlarged view of E in FIG. 7.

According to some embodiments of the present application, as shown in FIG. 7 to FIG. 9, the energy storage box 100 further includes: a first pipeline assembly 80. The first pipeline assembly 80 has a first pipeline 801 and a second pipeline 802. The first pipeline 801 is communicated between the outlet of the corresponding first medium flow path and the medium inlet. The second pipeline 802 is communicated between the inlet of the corresponding first medium flow path and the medium outlet.

A plurality of first pipeline assemblies 80 may be provided. In some optional embodiments of the present application, the quantity of the first pipeline assemblies 80 may be the same as the quantity of the energy storage devices 70, and the plurality of first pipeline assemblies 80 and the plurality of energy storage devices 70 may be in a one-to-one correspondence. Each first pipeline assembly 80 may have the first pipeline 801 and the second pipeline 802. The first pipeline 801 may be communicated between the medium inlet of the temperature adjustment device 30 and the outlet of the first medium flow path of the corresponding energy storage device 70. The second pipeline 802 may be communicated between the medium outlet of the temperature adjustment device 30 and the inlet of the first medium flow path of the corresponding energy storage device 70. When the second drive pump is working, the heat exchange medium can be driven to flow from the medium outlet of the temperature adjustment device 30 into the second pipeline 802, the first medium flow path, and the first pipeline 801 in sequence, and flow from the first pipeline 801 back to the temperature adjustment device 30.

In the above technical solution, the first pipeline 801 is communicated between the medium inlet of the temperature adjustment device 30 and the outlet of the first medium flow path of the corresponding energy storage device 70, and the second pipeline 802 is communicated between the medium outlet of the temperature adjustment device 30 and the inlet of the first medium flow path of the corresponding energy storage device 70, so that the heat exchange medium can circulate between the temperature adjustment device 30 and the first medium flow path, which is beneficial to improving thermal management efficiency of the temperature adjustment device 30.

According to some embodiments of the present application, as shown in FIG. 1, FIG. 4, and FIG. 7 to FIG. 9, a plurality of first pipeline assemblies 80 and a plurality of energy storage devices 70 are provided. The plurality of first pipeline assemblies 80 communicate with the plurality of energy storage devices 70 in a one-to-one correspondence.

A plurality of first pipeline assemblies 80 may be provided, a plurality of energy storage devices 70 may be provided, and the quantity of the first pipeline assemblies 80 may be the same as the quantity of the energy storage devices 70. For example, the quantity of the first pipeline assemblies 80 and the quantity of the energy storage devices 70 may be, but is not limited to, three, four, five, six, or the like. The plurality of first pipeline assemblies 80 may communicate with the plurality of energy storage devices 70 in a one-to-one correspondence. Specifically, the first pipeline 801 of each first pipeline assembly 80 may be communicated between the medium inlet of the temperature adjustment device 30 and the outlet of the first medium flow path of the corresponding energy storage device 70. The second pipeline 802 of each first pipeline assembly 80 may be communicated between the medium outlet of the temperature adjustment device 30 and the inlet of the first medium flow path of the corresponding energy storage device 70.

In some optional embodiments of the present application, the quantity of the second drive pumps may be the same as the quantity of the first pipeline assemblies 80, and the plurality of second drive pumps and the plurality of first pipeline assemblies 80 may be arranged in a one-to-one correspondence. Each second drive pump may drive the heat exchange medium to circulate in the corresponding first pipeline assembly 80, so that the heat exchange medium circulates among the corresponding first pipeline assembly 80, the corresponding energy storage device 70, and the temperature adjustment device 30. The second drive pump may be arranged on the corresponding first pipeline assembly 80, or the second drive pump may be arranged on the temperature adjustment device 30.

In some optional embodiments of the present application, the ratio of the quantity of energy storage devices 70 to the quantity of first pipeline assemblies 80 may be a positive integer, for example, but not limited to 2, 3, or the like. In this way, the plurality of energy storage devices 70 may communicate with a circulation loop by using one first pipeline assembly 80, which is beneficial to reducing the quantity of the first pipeline assemblies 80 and is beneficial to reducing costs of the energy storage box 100.

In the above technical solution, the plurality of first pipeline assemblies 80 and the plurality of energy storage devices 70 are provided, and the plurality of first pipeline assemblies 80 are connected to the plurality of energy storage devices 70 in a one-to-one correspondence, so that the corresponding energy storage devices 70 may respectively communicate with a plurality of circulation loops through the plurality of first pipeline assemblies 80, which is beneficial to implementing accurate temperature control on the plurality of energy storage devices 70, and is beneficial to improving temperature consistency among the plurality of energy storage devices 70 in the energy storage box 100, and the power distribution box 20 and the plurality of energy storage devices 70 can share one heat exchange mechanism, which can simplify the structure of the energy storage box 100, thereby reducing manufacturing costs of the energy storage box 100.

According to some embodiments of the present application, as shown in FIG. 7, the plurality of first pipeline assemblies 80 are arranged in parallel.

The first pipeline 801 of each first pipeline assembly 80 may be arranged to communicate with the medium inlet of the temperature adjustment device 30, the second pipeline 802 of each first pipeline assembly 80 may be arranged to communicate with the medium outlet of the temperature adjustment device 30, and the plurality of first pipeline assemblies 80 are arranged in parallel. That is, every two first pipeline assemblies 80 are not connected in sequence.

In some optional embodiments of the present application, the temperature adjustment device 30 has a plurality of medium inlets and a plurality of medium outlets. The quantity of the medium inlets, the quantity of the medium outlets, and the quantity of the plurality of first pipeline assemblies 80 are the same. Each first pipeline assembly 80 may separately communicate with the corresponding medium inlet and the corresponding medium outlet.

In the above technical solution, the plurality of first pipeline assemblies 80 are arranged in parallel, so that interference among the plurality of first pipeline assemblies 80 can be reduced, which is beneficial to implementing accurate temperature control on the plurality of energy storage devices 70, and is beneficial to improving temperature consistency among the plurality of energy storage devices 70 in the energy storage box 100, and the plurality of energy storage devices 70 can share one temperature adjustment device 30, which can simplify the structure of the energy storage box 100, and is beneficial to reducing manufacturing costs of the energy storage box 100. In addition, the plurality of first pipeline assemblies 80 are arranged in parallel, which is beneficial to maintaining temperature consistence of the heat exchange medium in the plurality of first pipeline assemblies 80, and is beneficial to reducing temperature differences of the heat exchange medium in the plurality of first pipeline assemblies 80.

In a specific embodiment of the present application, one energy storage box 100 may include two temperature adjustment devices 30 and ten energy storage devices 70. In such an embodiment, those shown in FIG. 7 may be understood as temperature adjustment devices 30 and first pipeline assemblies 80 of one energy storage box 100.

According to some embodiments of the present application, as shown in FIG. 7, the second medium flow path communicates with the temperature adjustment device 30 through the first pipeline assembly 80 to form the second medium circulation flow path.

The heat exchange device 40 has a second medium flow path, and the second medium flow path of the heat exchange device 40 may communicate with the temperature adjustment device 30 through the first pipeline assembly 80 to form the second medium circulation flow path.

In some optional embodiments of the present application, the heat exchange device 40 may include a first heat exchange member 401 and a second heat exchange member 404. A second medium flow channel of the second heat exchange member 404 may be arranged upstream of a first medium flow channel of the first heat exchange member 401. In some optional embodiments of the present application, the second medium flow channel of the second heat exchange member 404 may be arranged downstream of the first medium flow channel of the first heat exchange member 401. Taking the second medium flow channel arranged downstream of the first medium flow channel as an example for description, as shown in FIG. 5, the first heat exchange member 401 may have the first inlet and the first outlet. The first inlet and the first outlet both communicate with the first medium flow channel. The second heat exchange member 404 may have a second inlet and a second outlet. The second inlet and the second outlet both communicate with the second medium flow channel.

The first inlet of the first heat exchange member 401 may communicate with the first pipeline assembly 80 through a first communication pipeline 405 to communicate with the temperature adjustment device 30. Specifically, the first inlet of the first heat exchange member 401 may communicate with the second pipeline 802 of the first pipeline assembly 80 through the first communication pipeline 405 to communicate with the temperature adjustment device 30. The first outlet of the first heat exchange member 401 may communicate with the second inlet of the second heat exchange member 404 through a second communication pipeline 406. The second outlet of the second heat exchange member 404 may communicate with the first pipeline assembly 80 through a third communication pipeline 407 to communicate with the temperature adjustment device 30. Specifically, the second outlet of the second heat exchange member 404 may communicate with the first pipeline 801 of the first pipeline assembly 80 through the third communication pipeline 407 to communicate with the temperature adjustment device 30.

In the above technical solution, the second medium flow path communicates with the temperature adjustment device 30 through the first pipeline assembly 80 to form the second medium circulation flow path, so that the power distribution box 20 and the energy storage device 70 can share one heat exchange mechanism, which can simplify the structure of the energy storage box 100, thereby reducing manufacturing costs of the energy storage box 100. In addition, the heat exchange medium in the temperature adjustment device 30 can heat or cool the power distribution box 20, which can reduce energy consumption of the energy storage box 100.

According to some embodiments of the present application, as shown in FIG. 7, the temperature adjustment device 30 has a heat exchange flow path 90. The medium inlet and the medium outlet are formed at two ends of the heat exchange flow path 90.

The temperature adjustment device 30 can selectively heat or cool the heat exchange medium, and the temperature adjustment device 30 may have the heat exchange flow path 90. The medium inlet and the medium outlet may be formed at two ends of the heat exchange flow path 90. The first medium flow path may be communicated between the medium inlet and the medium outlet to form the first medium circulation flow path. Specifically, the first pipeline 801 of the first pipeline assembly 80 may communicate with the medium inlet, and the second pipeline 802 of the first pipeline assembly 80 may communicate with the medium outlet. In addition, when the second drive pump is working, the heat exchange medium can be driven to flow from the medium outlet of the heat exchange flow path 90 into the first pipeline assembly 80, and then the heat exchange medium in the first pipeline assembly 80 can flow back to the temperature adjustment device 30 through the medium inlet of the heat exchange flow path 90.

In addition, the second medium flow path of the heat exchange device 40 may communicate with the medium inlet and the medium outlet of the temperature adjustment device 30 through the first pipeline assembly 80 to form the second medium circulation flow path.

In the above technical solution, the medium inlet and the medium outlet are formed at both ends of the heat exchange flow path 90, so that the first medium flow path can be communicated between the medium inlet and the medium outlet, which is beneficial to reducing assembly difficulty of the energy storage box 100 and improving assembly efficiency of the energy storage box 100, and the power distribution box 20 and the energy storage device 70 can share one heat exchange mechanism, which can simplify the structure of the energy storage box 100, thereby reducing manufacturing costs of the energy storage box 100.

According to some embodiments of the present application, a plurality of heat exchange flow paths 90 and a plurality of energy storage devices 70 are provided. The plurality of heat exchange flow paths 90 are connected to the plurality of energy storage devices 70 in a one-to-one correspondence.

A plurality of heat exchange flow paths 90 may be provided. A plurality of energy storage devices 70 may be provided. Each heat exchange flow path 90 has a medium inlet and a medium outlet. The first medium flow path of each of the plurality of energy storage devices 70 may be communicated between the medium inlet and the medium outlet of the corresponding heat exchange flow path 90 to form the first medium circulation flow path. In addition, the second medium flow path of the heat exchange device 40 may communicate with the medium inlet and the medium outlet of the corresponding heat exchange flow path 90 through any first pipeline assembly 80.

In some optional embodiments of the present application, the quantity of the second drive pumps may be the same as the quantity of the heat exchange flow paths 90, and the plurality of second drive pumps and the plurality of heat exchange flow paths 90 may be arranged in a one-to-one correspondence. Each second drive pump may drive the heat exchange medium to flow from the medium outlet of the corresponding heat exchange flow path 90 into the corresponding first medium flow path. In some optional embodiments of the present application, each second drive pump may be arranged in the corresponding heat exchange flow path 90.

In the above technical solution, the plurality of heat exchange flow paths 90 and the plurality of energy storage devices 70 are provided, and the plurality of heat exchange flow paths 90 are connected to the plurality of energy storage devices 70 in a one-to-one correspondence, so that the corresponding energy storage devices 70 may respectively communicate with a plurality of circulation loops through the plurality of heat exchange flow paths 90, which is beneficial to implementing accurate temperature control on the plurality of energy storage devices 70, and is beneficial to improving temperature consistency among the plurality of energy storage devices 70 in the energy storage box 100. In addition, the plurality of energy storage devices 70 can share one temperature adjustment device 30, and the power distribution box 20 and the plurality of energy storage devices 70 can share one heat exchange mechanism, which can simplify the structure of the energy storage box 100, thereby reducing manufacturing costs of the energy storage box 100.

In some optional embodiments of the present application, the box body 10 may have a plurality of independent mounting compartments. For example, the box body 10 may have a battery compartment, an electrical compartment, a first mounting compartment, and a second mounting compartment. The battery compartment, the electrical compartment, the first mounting compartment, and the second mounting compartment are independent of each other. The main control box 60 may be arranged in the first mounting compartment. The temperature adjustment device 30 may be arranged in the second mounting compartment. The energy storage device 70 may be arranged in the battery compartment. The power distribution box 20 may be arranged in the electrical compartment. In this way, a probability of mutual interference among the energy storage device 70, the power distribution box 20, the main control box 60, and the temperature adjustment device 30 may be reduced, which is beneficial to improving use reliability of the energy storage box 100.

In some optional embodiments of the present application, the temperature adjustment device 30 may be configured as a water-cooling unit.

Figure 16:
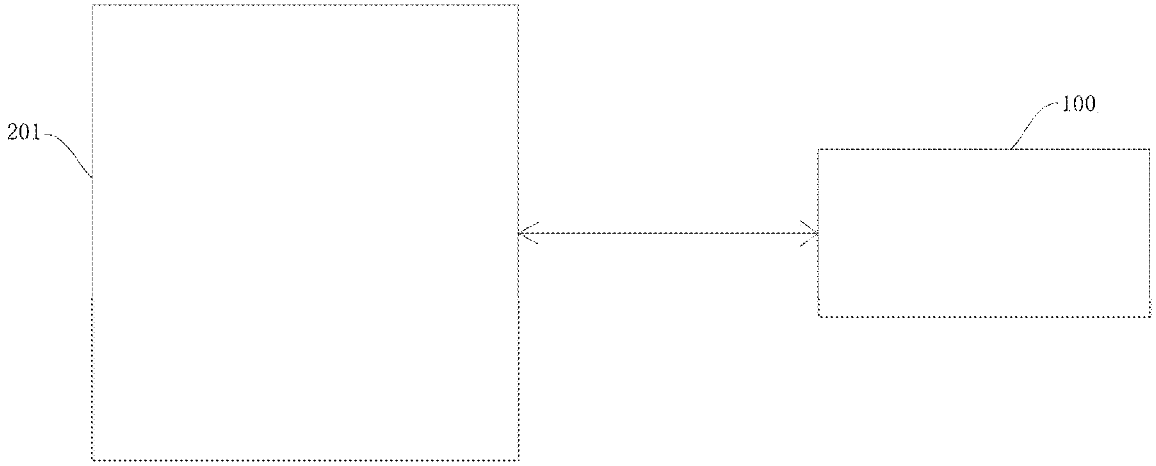
FIG. 16 is a schematic diagram of an embodiment of an energy storage system according to the present application.
Figure 17:
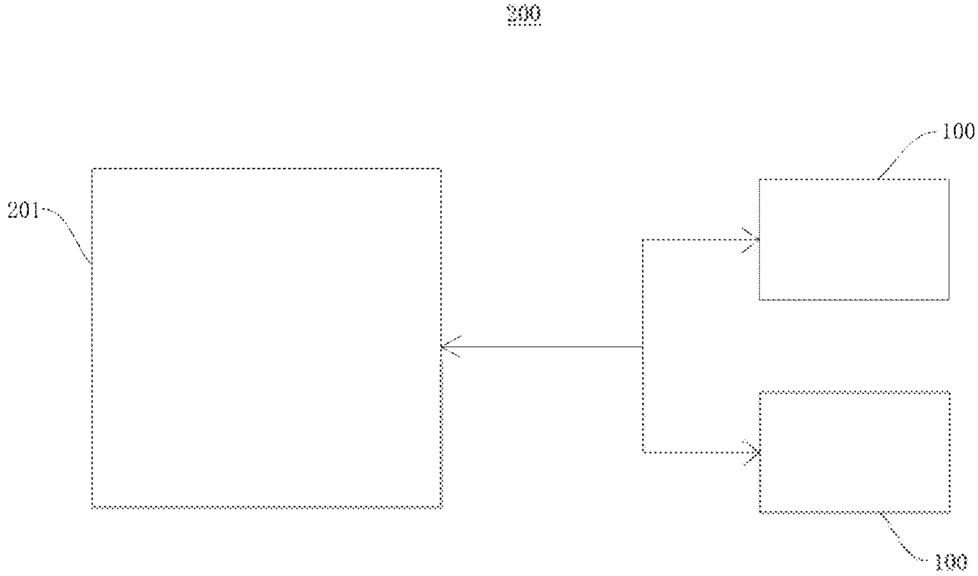
FIG. 17 is a schematic diagram of another embodiment of an energy storage system according to the present application.

According to some embodiments of the present application, as shown in FIG. 16 and FIG. 17, the present application further provides an energy storage system 200. The energy storage system 200 includes the energy storage box 100 described above.

According to some embodiments of the present application, as shown in FIG. 16 and FIG. 17, the energy storage system 200 further includes: a bidirectional power conversion system 201. The bidirectional power conversion system 201 is connected to at least one energy storage box 100.

The bidirectional power conversion system 201 (PCS) may be connected to at least one energy storage box 100. The bidirectional power conversion system 201 may perform alternating current conversion and direct current conversion, and the bidirectional power conversion system 201 may implement protective charge and discharge of the energy storage device 70. It should be noted that the bidirectional power conversion system 201 may be connected to, but not limited to, two, three, or four energy storage boxes 100. Each energy storage box 100 may have a plurality of energy storage devices 70 (for example, five or ten), and each energy storage box 100 may have a plurality of main control boxes 60. The plurality of main control boxes 60 may be correspondingly connected to the plurality of energy storage devices 70.

In an optional embodiment of the present application, as shown in FIG. 16, the bidirectional power conversion system 201 may be connected to one energy storage box 100. In an optional embodiment of the present application, as shown in FIG. 17, the bidirectional power conversion system 201 may be connected to two energy storage boxes 100.

In the above technical solution, one bidirectional power conversion system 201 may be connected to the plurality of energy storage boxes 100, so that the energy storage devices 70 of the plurality of energy storage boxes 100 may be protectively charged and discharged, which is beneficial to reducing costs and is further beneficial to increasing the service life of the energy storage devices 70.

According to some embodiments of the present application, referring to FIG. 1 to FIG. 17, the present application provides an energy storage box 100. The energy storage box 100 includes a box body 10, a power distribution box 20, an energy storage device 70, a heat exchange mechanism, a first drive pump 50, a second drive pump, a first pipeline assembly 80, and a main control box 60.

The power distribution box 20 and the energy storage device 70 are both arranged in the box body 10. The energy storage device 70 has a first medium flow path. The heat exchange mechanism includes a temperature adjustment device 30 and a heat exchange device 40. The temperature adjustment device 30 is arranged in the box body 10. The temperature adjustment device 30 communicates with the first medium flow path to form the first medium circulation flow path. The temperature adjustment device 30 can selectively heat or cool the heat exchange medium. At least part of the heat exchange device 40 is arranged in the power distribution box 20 and exchanges heat with the power distribution box 20. The heat exchange device 40 has a second medium flow path. The temperature adjustment device 30 communicates with the second medium flow path to form the second medium circulation flow path, and the second medium circulation flow path is selectively open or closed.

The heat exchange device 40 includes a first heat exchange member 401, a first heat sink 402, a first air supply member 403, a second heat exchange member 404, and a second air supply member 408. A first medium flow channel is formed in the first heat exchange member 401 and the first heat exchange member is attached to the power distribution box 20. The first heat sink 402, the first air supply member 403, and the first heat exchange member 401 may be stacked. In addition, the first heat exchange member 401 may be arranged between the first heat sink 402 and the first air supply member 403. A second medium flow channel is formed in the second heat exchange member 404 and the second heat exchange member is arranged on the power distribution box 20. The second medium flow channel is connected between the first medium flow channel and the temperature adjustment device 30 to communicate the first medium flow channel with the temperature adjustment device 30.

The power distribution box 20 includes a main box body 21 and an air guide portion 22 connected to each other. The air guide portion 22 is located outside the main box body 21 and forms an air guide channel. The air guide channel communicates with the interior of the power distribution box 20. The second heat exchange member 404 is arranged in the air guide channel to exchange heat with air in the air guide channel. The second air supply member 408 is arranged on the main box body 21 and is adapted to draw the air in the main box body 21 into the air guide channel.

The first drive pump 50 is connected between the second medium flow path and the temperature adjustment device 30 to drive the heat exchange medium to circulate in the second medium circulation flow path. A plurality of second drive pumps and a plurality of first medium circulation flow paths are provided. The plurality of second drive pumps are connected to the plurality of first medium circulation flow paths in a one-to-one correspondence. The second drive pump can drive the heat exchange medium to circulate in the corresponding first medium circulation flow path.

The temperature adjustment device 30 has a medium inlet and a medium outlet. The first pipeline assembly 80 has a first pipeline 801 and a second pipeline 802. The first pipeline 801 is communicated between the medium inlet and an outlet of the corresponding first medium flow path, and the second pipeline 802 is communicated between the medium outlet and an inlet of the corresponding first medium flow path, to form the first medium circulation flow path. A plurality of first pipeline assemblies 80 and a plurality of energy storage devices 70 are provided. The plurality of first pipeline assemblies 80 are connected to the plurality of energy storage devices 70 in a one-to-one correspondence. The plurality of first pipeline assemblies 80 are arranged in parallel. The second medium flow path communicates with the temperature adjustment device 30 through the first pipeline assembly 80 to form the second medium circulation flow path.

The main control box 60 is connected to the energy storage device 70 to control the energy storage device 70. The main control box 60 has a flow disturbance member therein, so that air flows in the main control box 60. The flow disturbance member, the first air supply member 403, and the second air supply member 408 may all be configured as fans.

In the above technical solution, the temperature adjustment device 30 cooperates with the heat exchange device 40, so that the power distribution box 20 and the energy storage device 70 can share one heat exchange mechanism, which can simplify the structure of the energy storage box 100, thereby reducing manufacturing costs of the energy storage box 100. In addition, the heat exchange medium in the temperature adjustment device 30 can heat or cool the power distribution box 20, which can reduce energy consumption of the energy storage box 100.

In the description of the present specification, descriptions referring to the terms "one embodiment", "some embodiments", "exemplary embodiments", "examples", "specific examples" or "some examples" mean that specific features, structures, materials or characteristics described in connection with this embodiment or example are included in at least one embodiment or example of the present application. In this specification, the schematic representations of the above terms are not necessarily aimed at the same embodiment or example. Moreover, the described specific features, structures, materials, or characteristics may be combined in a suitable manner in any one or more embodiments or examples.

Although embodiments of the present application have been shown and described, it is understood by those of ordinary skill in the art that various changes, modifications, substitutions and variations can be made to these embodiments without departing from the principles and spirit of the present application, and the scope of the present application is defined by the appended claims and their equivalents.

What is claimed is:

1. An energy storage box, comprising:

a box body;

a power distribution box and an energy storage device, wherein the power distribution box and the energy storage device are both arranged in the box body, and the energy storage device has a first medium flow path;

a heat exchange mechanism, wherein the heat exchange mechanism comprises:

a heat exchange device, wherein at least part of the heat exchange device is arranged in the power distribution box, and the heat exchange device has a second medium flow path; and a temperature adjustment device, wherein the temperature adjustment device communicates with the first medium flow path to form a first medium circulation flow path, the temperature adjustment device is connected to the second medium flow path to form a second medium circulation flow path, the first medium circulation flow path and the second medium circulation flow path comprise a heat exchange medium therein, and the temperature adjustment device is configured to adjust the temperature of the heat exchange medium; and a first drive pump, wherein the first drive pump is connected between the second medium flow path and the temperature adjustment device to drive a heat exchange medium to circulate in the second medium circulation flow path.

2. The energy storage box according to claim 1, wherein the second medium flow path communicates with the first medium flow path, so that the heat exchange medium whose temperature is adjusted by the temperature adjustment device flows into the second medium flow path through part of the first medium flow path.

3. The energy storage box according to claim 1, wherein the heat exchange device comprises: a first heat exchange member, a first medium flow channel is formed in the first heat exchange member and the first heat exchange member is attached to the power distribution box, the first medium flow channel is formed as at least part of the second medium flow path, and the first medium flow channel communicates with the temperature adjustment device to form the second medium circulation flow path.

4. The energy storage box according to claim 3, wherein the heat exchange device further comprises:

a first heat sink, wherein the first heat sink is arranged on the first heat exchange member to dissipate heat from the first heat exchange member; or a first air supply member, wherein the first air supply member is adapted to blow air toward the first heat exchange member.

5. The energy storage box according to claim 3, wherein the heat exchange device further comprises: a second heat exchange member, a second medium flow channel is formed in the second heat exchange member and the second heat exchange member is arranged on the power distribution box, and the second medium flow channel is connected between the first medium flow channel and the temperature adjustment device to communicate the first medium flow channel with the temperature adjustment device.

6. The energy storage box according to claim 5, wherein the power distribution box has an air guide channel communicating with the interior of the power distribution box, and the second heat exchange member is arranged in the air guide channel to exchange heat with air in the air guide channel.

7. The energy storage box according to claim 6, wherein the air guide channel has a first open end and a second open end, the first open end communicates with the interior of the power distribution box, and the second heat exchange member is arranged at the second open end.

8. The energy storage box according to claim 6, wherein the power distribution box comprises a main box body and an air guide portion connected to each other, the air guide portion is located outside the main box body and forms the air guide channel, the main box body has a communication hole, and the communication hole communicates the air guide channel with the main box body.

9. The energy storage box according to claim 8, further comprising: a second air supply member, wherein the second air supply member is arranged on the main box body and corresponds to the communication hole, and the second air supply member is adapted to draw air from the main box body into the air guide channel.

10. The energy storage box according to claim 1, further comprising: a second drive pump, wherein the second drive pump is arranged in the first medium circulation flow path to drive a heat exchange medium to circulate in the first medium circulation flow path.

11. The energy storage box according to claim 10, wherein a plurality of second drive pumps and a plurality of first medium circulation flow paths are provided, and the plurality of second drive pumps are connected to the plurality of first medium circulation flow paths in a one-to-one correspondence.

12. The energy storage box according to claim 1, further comprising: a main control box, wherein the main control box is connected to the energy storage device to control the energy storage device, and the main control box is provided with a flow disturbance member therein, so that air flows in the main control box.

13. The energy storage box according to claim 1, wherein the temperature adjustment device has a medium inlet and a medium outlet, and the first medium flow path is communicated between the medium inlet and the medium outlet to form the first medium circulation flow path.

14. The energy storage box according to claim 13, further comprising: a first pipeline assembly, wherein the first pipeline assembly has a first pipeline and a second pipeline, the first pipeline is communicated between the medium inlet and an outlet of the corresponding first medium flow path, and the second pipeline is communicated between the medium outlet and an inlet of the corresponding first medium flow path.

15. The energy storage box according to claim 14, wherein a plurality of first pipeline assemblies and a plurality of energy storage devices are provided, and the plurality of first pipeline assemblies communicate with the plurality of energy storage devices in a one-to-one correspondence.

16. The energy storage box according to claim 15, wherein the plurality of first pipeline assemblies are arranged in parallel.

17. The energy storage box according to claim 14, wherein the second medium flow path communicates with the temperature adjustment device through the first pipeline assembly to form the second medium circulation flow path.

18. An energy storage system, comprising the energy storage box according to claim 1.

19. An energy storage box, comprising:

a box body;

a power distribution box and an energy storage device, wherein the power distribution box and the energy storage device are both arranged in the box body, and the energy storage device has a first medium flow path;

a heat exchange mechanism, wherein the heat exchange mechanism comprises:

a heat exchange device, wherein at least part of the heat exchange device is arranged in the power distribution box, and the heat exchange device has a second medium flow path; and a temperature adjustment device, wherein the temperature adjustment device communicates with the first medium flow path to form a first medium circulation flow path, the temperature adjustment device is connected to the second medium flow path to form a second medium circulation flow path, the first medium circulation flow path and the second medium circulation flow path comprise a heat exchange medium therein, and the temperature adjustment device is configured to adjust the temperature of the heat exchange medium; and a drive pump arranged in the first medium circulation flow path to drive a heat exchange medium to circulate in the first medium circulation flow path.

20. An energy storage box, comprising:

a box body;

a power distribution box and an energy storage device, wherein the power distribution box and the energy storage device are both arranged in the box body, and the energy storage device has a first medium flow path;

a heat exchange mechanism, wherein the heat exchange mechanism comprises:

a heat exchange device, wherein at least part of the heat exchange device is arranged in the power distribution box, and the heat exchange device has a second medium flow path; and a temperature adjustment device, wherein the temperature adjustment device communicates with the first medium flow path to form a first medium circulation flow path, the temperature adjustment device is connected to the second medium flow path to form a second medium circulation flow path, the first medium circulation flow path and the second medium circulation flow path comprise a heat exchange medium therein, the temperature adjustment device is configured to adjust the temperature of the heat exchange medium, the temperature adjustment device has a medium inlet and a medium outlet, and the first medium flow path is communicated between the medium inlet and the medium outlet to form the first medium circulation flow path; and a first pipeline assembly, wherein the first pipeline assembly has a first pipeline and a second pipeline, the first pipeline is communicated between the medium inlet and an outlet of the corresponding first medium flow path, and the second pipeline is communicated between the medium outlet and an inlet of the corresponding first medium flow path.

* * * * *